(12) United States Patent
Liu

(10) Patent No.: US 6,980,537 B1
(45) Date of Patent: Dec. 27, 2005

(54) METHOD AND APPARATUS FOR COMMUNICATION NETWORK CLUSTER FORMATION AND TRANSMISSION OF NODE LINK STATUS MESSAGES WITH REDUCED PROTOCOL OVERHEAD TRAFFIC

(75) Inventor: Yu-Jih Liu, Ledgewood, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 945 days.

(21) Appl. No.: 09/709,502

(22) Filed: Nov. 13, 2000

Related U.S. Application Data

(60) Provisional application No. 60/164,955, filed on Nov. 12, 1999, provisional application No. 60/164,942, filed on Nov. 12, 1999.

(51) Int. Cl.[7] ............................................. H04Q 7/24
(52) U.S. Cl. ........................ 370/338; 370/310; 370/277
(58) Field of Search ................................ 370/328, 389, 370/401, 400, 407, 338, 315, 310

(56) References Cited

U.S. PATENT DOCUMENTS

| | | |
|---|---|---|
| 4,958,343 A | 9/1990 | Abramovici et al. |
| 5,068,916 A | 11/1991 | Harrison et al. |
| 5,231,634 A | 7/1993 | Giles et al. |
| 5,233,604 A | 8/1993 | Ahmadi et al. |
| 5,241,542 A | 8/1993 | Natarajan et al. |
| 5,317,566 A | 5/1994 | Joshi |
| 5,530,912 A | 6/1996 | Agrawal et al. |
| 5,535,195 A | 7/1996 | Lee |
| 5,631,897 A | 5/1997 | Pacheco et al. |
| 5,684,794 A | 11/1997 | Lopez et al. |
| 5,687,168 A | 11/1997 | Iwata |
| 5,745,694 A | 4/1998 | Egawa et al. |
| 5,805,593 A | 9/1998 | Busche |

(Continued)

FOREIGN PATENT DOCUMENTS

| | | |
|---|---|---|
| DE | 41069741 A1 | 9/1992 |

(Continued)

OTHER PUBLICATIONS

Adjih, C. et al.; "Link State Routing in Wireless Ad-Hoc Networks"; MILCOM Proceedings; Oct. 2003; pp. 1-6.

(Continued)

*Primary Examiner*—Duc Ho
*Assistant Examiner*—Thien D. Tran
(74) *Attorney, Agent, or Firm*—Edell, Shapiro, & Finnan

(57) ABSTRACT

The present invention facilitates cluster formation within a communications network by utilizing network topology information to designate network nodes that are crucial for relaying traffic as cluster head nodes, while remaining network nodes are designated as member nodes. A beacon packet transmission rate of a network node or the interval between successive beacon packet transmissions by that node is adjusted by the present invention to facilitate cluster formation independent of network size and varying initial start times of network nodes. In addition, the present invention utilizes the above described cluster formation technique to form a three tier architecture for transmission or flooding of routing information from head node databases throughout the network. The cluster formation technique is applied to cluster head nodes to form an additional network tier of super nodes that distribute routing information, while cluster head nodes route network data traffic. The databases of cluster head nodes are examined subsequent to flooding of head node database information by super nodes, where data missing from a head node database is requested from a corresponding super node, thereby eliminating transmissions of acknowledgment messages.

68 Claims, 10 Drawing Sheets

U.S. PATENT DOCUMENTS

| | | | |
|---|---|---|---|
| 5,805,977 A | | 9/1998 | Hill et al. |
| 5,805,995 A | | 9/1998 | Jiang et al. |
| 5,825,772 A | | 10/1998 | Dobbins et al. |
| 5,881,095 A | | 3/1999 | Cadd |
| 5,896,561 A | | 4/1999 | Schrader et al. |
| 5,903,559 A | | 5/1999 | Acharya et al. |
| 5,909,651 A | | 6/1999 | Chander et al. |
| 6,052,594 A | | 4/2000 | Chuang et al. |
| 6,130,881 A | * | 10/2000 | Stiller et al. ................ 370/238 |
| 6,192,053 B1 | | 2/2001 | Angelico et al. |
| 6,205,146 B1 | * | 3/2001 | Rochberger et al. ... 370/395.53 |
| 6,208,870 B1 | | 3/2001 | Lorello et al. |
| 6,246,875 B1 | | 6/2001 | Seazholtz et al. |
| 6,260,072 B1 | * | 7/2001 | Rodriguez-Moral ........ 709/241 |
| 6,304,556 B1 | * | 10/2001 | Haas .......................... 370/254 |
| 6,370,571 B1 | * | 4/2002 | Medin, Jr. .................. 709/218 |
| 2003/0165117 A1 | * | 9/2003 | Garcia-Luna-Aceves et al. 370/238 |

FOREIGN PATENT DOCUMENTS

| | | |
|---|---|---|
| JP | 06121373 | 4/1994 |
| JP | 08125654 | 5/1996 |
| JP | 09200850 | 7/1997 |
| JP | 09205668 | 8/1997 |
| JP | 11032373 | 2/1999 |
| WO | WO 09718637 | 5/1997 |

OTHER PUBLICATIONS

Henderson, T.R. et al.; "A Wireless Interface Type for OSPF"; Milcom Proceedings; Oct. 2003; pp. 1-6.

Cain, J.B. et al.; "A Link Scheduling and Ad Hoc Networking Approach Using Directional Antennas"; MILCOM Proceedings; Oct. 2003; pp. 1-6.

Macker, J.P. et al.; "A Study of Link State Flooding Optimizations for Scalable Wireless Networks"; MILCOM Proceedings; Oct. 2003; pp. 1-6.

Hsu, J. et al.; "Performance of Mobile Ad Hoc Networking Routing Protocols in Realistic Scenarios"; MILCOM Proceedings; Oct. 2003; pp. 1-6.

Clausen, T. et al.; "Optimized Link State Routing Protocol (OLSR)"; Internet RFC/STD/FYI/BCP Archives; Project Hipercom, INRIA; Oct. 2003; 75 pages.

Qayyum, A. et al.; "Multipoint relaying: An efficient technique for flooding in mobile wireless networks"; Mar. 2000; 18 pages.

Clausen, T. et al.; "Optimized Link State Routing Protocol"; Internet Draft; Jul. 1, 2002; 55 pages.

Jacquet, P. et al.; "Increasing Reliability in Cable-Free Radio LANs Low Level Forwarding in HIPERLAN"; Wireless Personal Communications, vol. 4, 1996; pp. 51-63.

Corson, M.S. et al.; "An Internet MANET Encapsulation Protocol (IMEP) Specification"; Internet Draft; Aug. 7, 1999; 37 pages.

Jacquet, P. et al.; "Optimized Link State Routing Protocol for Ad Hoc Networks"; Hipercom Project, INRIA; 2001 IEEE; pp. 62-68.

European Telecommunication Standard; Radio Equipment and Systems (RES); High PErformance Radio Local Area Network (HIPERLAN) Type 1; Functional spceification; ETSI; Oct. 1996; pp. 1-111.

Viennot, L.; "Complexity Results on election of Multipoint Relays in Wireless Networks"; INRIA; Dec. 1998; pp. 1-12.

Jacquet, P. et al.; "Optimized Link State Routing Protocol"; Internet Draft; Nov. 18, 1998; 17 pages.

Corson, M.S.; "An Internet MANET Encapsulation Protocol (IMEP) Specification"; Internet Draft; Nov. 26, 1997; 18 pages.

Lin, C.R. et al, "Real-time support in multihop wireless networks", Wireless Networks 5 (1999), pp. 125-135.

Koubias, S.A. et al, "Further results on the performance . . . ATP-2 for local area networks", IEEE Transactions on Computers, vol. V37, No. 3, 1988, pp. 376-383.

Bandai, M. et al., "Performance analysis of a channel reservation . . . unicast and multicast packets", Trans. Inst. Electron. Inf. Comm. Eng. B-I, Japan, vol. J82B-1, No. 2, Feb. 1999, pp. 236-250.

Riera, M.O.I. et al., "Variable channel reservation . . . mobility platforms", VTC '98, 48th IEEE Vehicluar Technology Conference, 1998, pp. 1259-1263.

Kee, Chaing Chua et al, "Probabilistic channel reservation . . . pico/microcellular networks", IEEE Commun. Lett. (USA), vol. 2, No. 7, Jul. 1998, pp. 195-196.

Tripathi, S.B. et al., "Performance analysis of microcellisation . . . cellular wireless networks", 1997 IEEE Inter. Conf. On Personal Wireless Communication, pp. 9-14.

Boumerdassi, S., "A new channel reservation . . . cellular communication systems", Broadband Communications, Fourth Intern. Conf. On Broadband Commun., 1998, pp. 157-168.

Wei, Huang et al, "Channel reservation for high rate service in cellular networks", 1997 IEEE Pacific Rim Conference, vol. 1, pp. 350-353.

Konishi, S. et al, "Flexible transmission bandwidth . . . for NGOSO MSS networks", IEEE J. Sel. Areas Commun. (USA), vol. 15, No. 7, Sep. 1997, pp. 1197-1207.

Ohta, C., et al, "Effects of moving mobiles . . . micro-cellular systems", IEEE Globecom 1996, vol. 1, 1996, pp. 535-539.

Kanazawa, A. et al, "Performance study of . . . micro-cellular systems", IEICE Trans. Fundam. Electron. Commun. Comput. Sci. (Japan), vol. E79-A, No. 7, Jul. 1996, p. 990-996.

Harms, J.J. et al, "Performance modeling of a channel reservation service", Comput. Netw. ISDN Syst. (Netherlands), vol. 27, No. 11, Oct. 1995, pp. 1487-1497.

Harms, J.J. et al, "Performance of scheduling algorithms for channel reservation", IEE Proc., Comput. Digit. Tech. (UK), vol. 141, No. 6, Nov. 1994, pp. 341-346.

Barghi, H. et al, "Time constrained performance . . . for local networks", Eleventh Annual International Phoenix Conference on Computers and Communications, 1992, pp. 644-650.

Masuda, E., "Traffic evaluation of . . . on a T-S-T network", Electron. Commun. Jpn. 1, Commun. (USA), vol. 72, No. 8, Aug. 1989, pp. 104-119.

"PacTel Withdraws . . . dialtone operations", Multichannel News Jan. 29, 1996, pp. 48.

Iwata et al, "Scalable Routing . . . Wireless Networks", IEEE Journal on Selected Areas in Communications, vol. 17, No. 8, Aug. 1999, pp. 1369-1379.

Joa-Ng, et al, "A Peer-to-Peer . . . Mobile Ad Hoc Networks", IEEE Journal on Selected Areas in Communications, vol. 17, No. 8, Aug. 1999, pp. 1415-1425.

Das et al, "Routing in ad hoc networks using a spine", Proceedings of 6th Intern. Conf. On Computer Commun. And Networks, Las Vegas, 1997, pp. 34-39.

Krishna et al, "A cluster-based approach for routing in ad-hoc networks", Proceedings of the Second USENIX Symposium on Mobile and Location—Independent Computing, 1995, pp. 1-10.

Baker D.J. et al, "The architectural organization of a mobile radio network via a distributed algorithm", IEEE Trans. Commun., vol. Com-29, No. 11, pp. 1694-1701, Nov. 1981.

Baker, D.J. et al, "A distributed algorithm . . . mobile radio network", in Proc. IEEE ICC'82, pp. 2F.6.1-2F.6.5.

Ephremides, A. et al, "A design Concept . . . hopping signaling", Proc. IEEE, Vol. 75, No. 1, Jan. 1987, pp. 56-73.

Gerla M. et al, "Multicluster, mobile, multimedia radio network", Baltzer Journals, Jul. 12, 1995, pp. 1-25.

Lin, C.R. et al, "Adaptive clustering for mobile wireless network", IEEE JSAC, Sep. 1997, pp. 1-21.

MingLiang et al, "Cluster Based Routing Protocol (CBRP) Functional Specification" Internet-Draft, Aug. 14, 1998.

Moy, J., "OSPF version 2", RFC2328, Apr. 1998.

Kweon, Seok-Kyo, Real-Time . . . Packet Networks (Quality of Service, ATM, Ethernet), 1998, pp. 1-158.

Huang, Yih, Group Communication Under Link-State Routing (Multipoint Communications, Leader Election), 1998, pp. 1-204.

Behrens, Jochen, Distributed Routing For Very Large Networks Based on Link Vectors (Routing Algorithm), 1997, pp. 1-109.

Khosravi-Sichani, et al, Performance Modeling and Analysis for the Survivable Signaling Network, Proceedings—IEEE Military Communication Conference, v 3, 1991, pp. 880-884.

Bellur, et al, "A Reliable, Efficient Topology . . . Dynamic Networks", IEEE INFOCOM '99, Conf. On Computer Commun. Proceed. 18th Annual Joint Conf. Of IEEE Comp. And Commun. Societies, vol. 1, 1999, pp. 178-186.

Ching-Chuan, et al, "On-Demand Multicast in Mobile Wireless Networks", Proceed. 6th Intern. Conf. On Network Protocols, 1998, pp. 262-270.

Garcia-Luna-Aceves, et al, "Scalable Link-State Internet Routing", Proceed. 6th Intern. Comf. On Network Protocols, 1998, pp. 52-61.

Huang et al, "Optimal Switch-Aided Flooding Operations in ATM Networks", 1998 IEEE ATM Workshop Proceedings, 1998, pp. 329-338.

Behrens, et al., Fast Disseminationof Link . . . Updates or Age Fields, Proceed. 17th Intern. Conf. On Distributed Computing Systems, 1997, pp. 51-58.

Garcia-Luna-Aceves, et al, "Distributed, Scalable Routing . . . States", IEEE J. Sel. Areas Commun. (USA), vol. 13, No. 8, Oct. 1995, pp. 1383-1395.

Behrens, et al, "Distributed, Scalable Routing Based on Link-State Vectors", Comput. Commun. Rev. (USA), vol. 24, No. 4, Oct. 1994, pp. 136-147.

Rutenburg et al, "How to Extract Maximum . . . Topology Updates", IEEE '93. Conf. On comp. Commun. Proceed. 12th Annual Joint Conf. Of the IEEE Comp. And Commun. Societies, 1993, pp. 1004-1013.

Garcia-Luna-Aceves, "Reliable Broadcast of Routing Information Using Diffusing Computations", GLOBECOM '92, Communication for Global Users, IEEE Global Tel. Conf., 1992, pp. 615-21.

Moy, J., "OSPF Version 2", RFC 1583, Mar. 1994.

Johnson et al, "Dynamic Source Routing in Ad Hoc Wireless Networks", Mobile Computing, 1996.

Broch et al, "The Dynamic Source Routing Protocol for Mobile Ad Hock Networks", IETF internet draft, Mar. 13, 1998.

Broch et al, "The Dynamic Source Routing Protocol for Mobile Ad Hock Networks", IETF internet draft, Oct. 22, 1999.

Johnson et al, "The Dynamic Source Routing Protocol for Mobile Ad Hock Network", IETF internet draft, Nov. 17, 2000.

Park et al, "Temporally-Ordered Routing Algorithm (TORA) version 1", IETF internet draft, Aug. 7, 1998.

Park et al, "Temporally-Ordered Routing Algorithm (TORA) version 1", IETF internet draft, Oct. 22, 1999.

Park et al, "Temporally-Ordered Routing Algorithm (TORA) version 1", IETF internet draft, Nov. 24, 2000.

Perkins, "Ad Hoc On Demand Distance Vector (AODV) Routing", IETF Internet draft, Nov. 20, 1997.

Perkins, "Ad Hoc On Demand Distance Vector (AODV) Routing", IETF Internet draft, Nov. 24, 2000.

Deering et al, "Protocol Independent Multicast Version2, Dense Mode Specification", IETF internet draft, May 21, 1997.

Garcia-Luna Aceves, "Source Tree Adaptive Routing (STAR) Protocol", IETF Draft, Oct. 1999.

Wu et al, "Ad Hoc Multicast Routing Protocol Utilizing Increasing id-numbers (AMRIS)", IETF internet draft, 1998.

Ballardie, "Core Based Tree Multicast Routing", RFC 2186, Sep. 1997.

Ballardie et al, "Core Based Tree (CBT)", SIGCOMM '93, 1993, pp. 86-94.

Chiang et al, "Shared Tree Wireless Network Network Multicast", IC3N'97, Apr. 1997, pp. 1-16.

Chiang et al, " Forwarding Group Multicast Protocol (FGMP) for Multihop", Mobile Wireless Networks, ACM-Baltzer Journal of Cluster Computing, 1998.

Lee et al, "On-Demand Multicast Routing Protocol (ODMRP) for Ad Hoc Networks", IETF internet draft, Jan. 2000.

North et al, "Wirelss Networked Radios: Comparison of Military, Commercial and R&D Protocols", Second Annual UCSD Conference on Wireless Communications, Mar. 3, 1999, pp. 1-6.

* cited by examiner

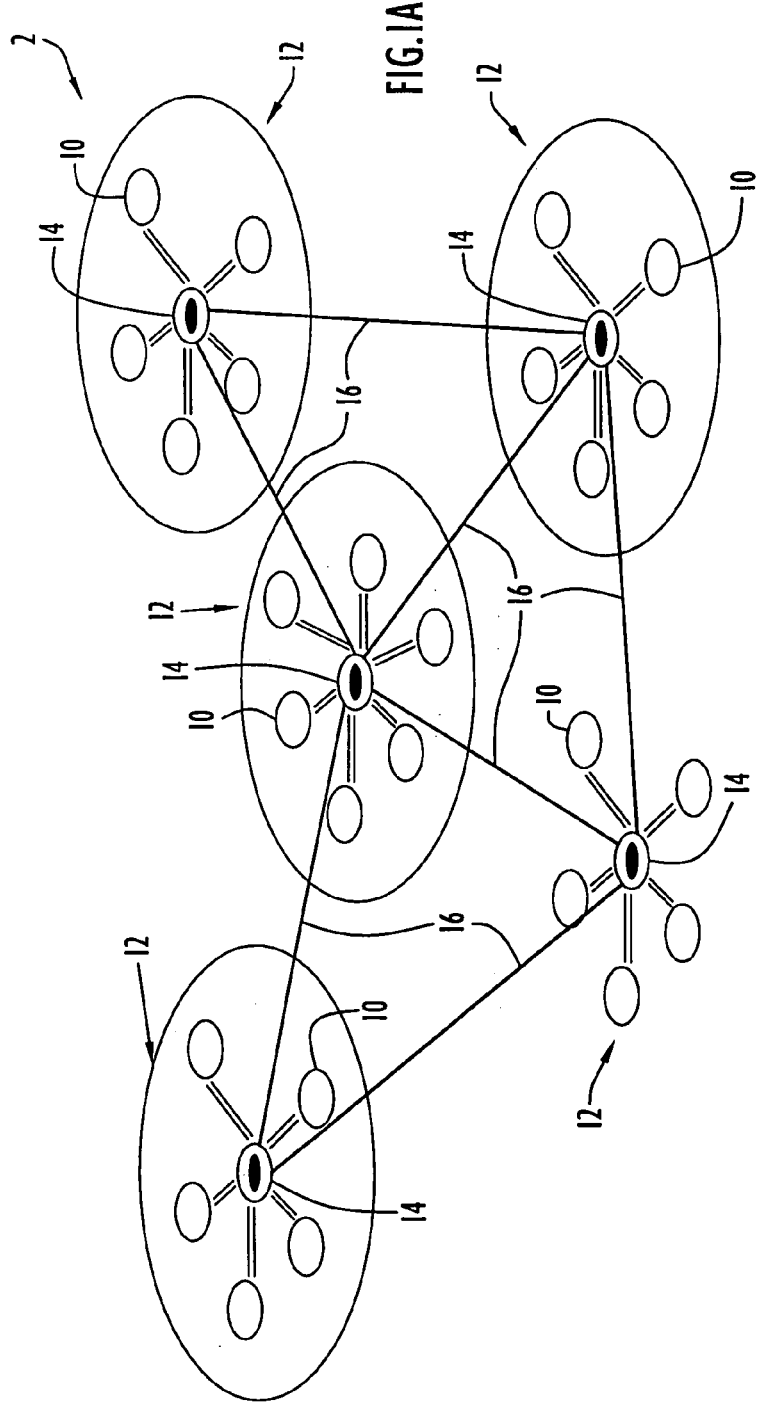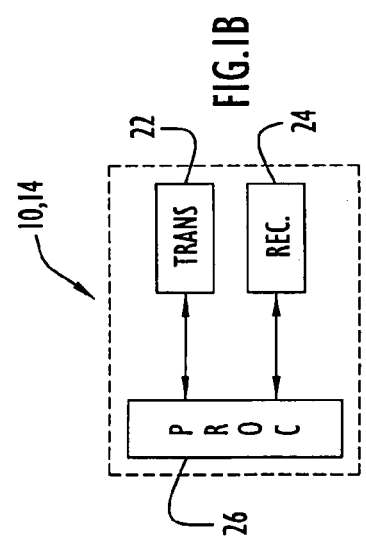

METHOD AND APPARATUS FOR COMMUNICATION NETWORK CLUSTER FORMATION AND TRANSMISSION OF NODE LINK STATUS MESSAGES WITH REDUCED PROTOCOL OVERHEAD TRAFFIC

CROSS-REFERENCE TO RELATED APPLICATIONS

This application claims priority from U.S. Provisional Patent Application Serial Nos. 60/164,955, entitled "Cluster Algorithm for Ad Hoc Wireless Network" and filed Nov. 12, 1999, and 60/164,942, entitled "Routing Algorithm for Ad Hoc Wireless Networks" and filed Nov. 12, 1999. The disclosures of those provisional applications are incorporated herein by reference in their entireties.

BACKGROUND OF THE INVENTION

1. Technical Field

The present invention pertains to communication systems. In particular, the present invention pertains to a wireless communication system utilizing network topology information to form clusters for data transmission by a minimal quantity of hops and without regard to initial start times of network nodes. In addition, the present invention pertains to a wireless communication system employing cluster formation to form a multiple tier network architecture and facilitate transmission of node link status messages with reduced protocol overhead traffic.

2. Discussion of Related Art

Generally, certain wireless networks, such as a cellular network, commonly utilize a relay station to forward a message from a mobile cellular unit to a desired destination. The relay station is typically a fixed base station where each mobile unit transmits an outgoing message directly to the base station (e.g., the base station is generally within one hop from the mobile units) for forwarding through a public telephone network to the desired destination. Ad hoc wireless networks (e.g., dynamic wireless networks without any routing infrastructure) are typically employed for military and personal communication applications. These types of networks do not include fixed base stations, but rather employ nodes that each dynamically determine a relay type network node to route traffic. Thus, the ad hoc network node is provided with a difficult task of determining a routing path for data transmission. Since several hops are typically required to facilitate communications, the cellular scheme described above is insufficient for ad hoc networks.

The related art has attempted to overcome the aforementioned problem by providing flat and hierarchical network architectures for data routing. In particular, the flat architecture basically includes a single tier of network nodes in communication with each other. The flat architecture performs adequately with small scale networks, however, overhead traffic increases rapidly and exceeds network capacity in response to increasing network size. The hierarchal architecture basically arranges a network into plural tiers or hierarchical levels. The first tier typically includes clusters or cells each including a plurality of communication nodes or cluster members. One node within each cluster is designated as the cluster head and has full connectivity to corresponding member nodes. The second tier includes a backbone network formed of the cluster head nodes to enable communications between different clusters (e.g., for data transmitted over greater distances). Thus, the first network tier represents each network node, while the second network tier represents cluster head nodes. In operation, a network member node initially transmits a message to its corresponding cluster head node which subsequently forwards the message through the backbone network (e.g., through plural hops of cluster head nodes) to a destination cluster head node associated with a destination member node. Since full connectivity exists between each cluster head node and its corresponding member nodes, the destination cluster head node transmits the message to the corresponding destination member node. This type of architecture is typically employed in communication networks for military applications.

The formation of clusters and designation of cluster head nodes is generally performed dynamically within the exemplary hierarchical network, while the network employs a routing protocol to facilitate communications within the network. The routing protocol is preferably a link-state type of protocol that is implemented on the backbone network (e.g., by the cluster head nodes). The cluster head nodes each include a database that has information enabling the cluster head nodes to determine appropriate paths for routing messages. In particular, each head node constructs a routing table to determine a successive link to transmit a message from that node toward a destination head node. This is accomplished by transmitting or flooding routing information from each head node database among cluster head nodes to synchronize those databases. In order to ensure receipt of database information, a receiving head node transmits an acknowledgment message to a source head node transmitting the database information. If an acknowledgment message is not received within a predetermined time interval, the database information is re-transmitted to the network head nodes that have not acknowledged receipt of the database information. In addition, each network node (e.g., cluster head and member nodes) periodically broadcasts a beacon type or node status packet in accordance with the routing protocol. This packet basically advertises the presence of a node within the network, and is typically utilized by cluster head nodes for "keep alive" and neighbor discovery purposes.

In order to facilitate internet routing or routing between the hierarchical and other external networks (e.g., the Internet), a modified version of the conventional Open Shortest Path First (OSPF) Protocol may be employed. The OSPF protocol is basically a routing protocol employed for Internet Protocol (IP) type networks, while the modified protocol or Radio Open Shortest Path First (ROSPF) protocol is similar to OSPF, but is adapted for use with radio or wireless networks. For examples of implementation of the OSPF Protocol, reference is made to RFC 1583, Moy, "OSPF Version 2," March 1994, the disclosure of which is incorporated herein by reference in its entirety.

Routing is accomplished in the OSPF protocol by each network node having a routing database containing information related to network topology (e.g., links between network nodes). The routing database is utilized by each node to determine a path for transmitting a message to a destination site. The routing databases are updated by exchanging Link-State Advertisement (LSA) packets between neighboring nodes. These packets generally include information related to current links of network nodes and are typically transferred periodically and/or in the event of a modification to the network topology. The OSPF protocol designates a particular router to flood LSA packets to neighbors in broadcast type networks, while LSA packets are transmitted via point-to-point within non-broadcast type networks. The ROSPF protocol employed by the hierarchical network described above is similar to the OSPF protocol and exchanges LSA type packets between neighbors (e.g., cluster head and member nodes) to synchronize routing databases as described above.

The hierarchical architecture may provide significant reduction in routing overhead traffic in relation to the flat architecture depending upon the quantity of cluster head nodes employed. Accordingly, the related art provides several clustering techniques to arrange a network into a hierarchical architecture. Initially, a cluster head node may be utilized to replace the functionality of a cellular network base station and basically serves as a pseudo base station for data traffic within a corresponding cluster. A technique of the related art for cluster head designation and subsequent cluster formation includes determining clusters based on identifiers (e.g., identification codes or numbers) of network nodes. This technique basically designates a network node having a lowest (e.g., or greatest) node identifier as a cluster head. The related art has expanded this technique to utilize a node identifier or a degree of node connectivity to designate a cluster head node, and has further modified the technique to employ interconnected non-overlapping clusters to cover an entire network.

In addition, clustering techniques have been employed for military communication applications and provide a basis for routing protocols. One such technique determines cluster head nodes in accordance with initial random start times of network nodes. Basically, each network node may initiate power or start up at various times, thereby providing a generally random node initiation sequence. A network node is designated as a cluster head node in response to node initiation and determining the absence of neighboring nodes. Thus, nodes having early initiation times tend to be designated as cluster head nodes by this technique. The routing protocol commonly designates cluster head nodes and forms clusters based on network node identifiers (e.g., lowest node identifier is designated as a head node) and certain designation rules.

The clustering techniques of the related art suffer from several disadvantages. In particular, the above clustering techniques generally utilize simple criteria to dynamically designate a cluster head without employing network topology information. In particular, the techniques typically designate a cluster head node based on lowest or greatest node identifier. However, this may result in no direct links between cluster head nodes, thereby requiring additional gateway type nodes (e.g., nodes having communications with two cluster head nodes) to facilitate communication between clusters and increasing the quantity of hops required for communication. The approach according to node random start times may designate a significant quantity of nodes as cluster head nodes, where the designations are typically not optimal selections for a network configuration. Further, this cluster formation technique depends upon the particular sequence of node initiation, thereby enabling particular initiation sequences to facilitate a formation failure. Moreover, the above clustering techniques complicate determination of an appropriate interval between node status packet transmissions. When the interval is set to a value below an acceptable range, large scale networks may become congested. Conversely, if the interval is set to a value above an acceptable range, an extensive time interval is required to complete cluster formation. In addition, the above clustering techniques typically require the initial start times of network nodes to be spaced apart a sufficient interval in order to avoid network failure as the quantity of nodes within the network increases.

With respect to the network architectures for data routing, the flat architecture performs adequately for small scale networks, but as network size increases, the flat network rapidly becomes congested since overhead traffic increases exponentially with network size. The hierarchical architecture reduces overhead traffic relative to the flat network architecture, however, this reduction is insufficient when the network employs on the order of several hundred nodes, thereby limiting application of the routing protocol. Although reliability of flooding node database information throughout a network is enhanced by transmission of acknowledgment messages, these messages increase overhead traffic, thereby degrading network performance.

The present invention overcomes the aforementioned problems by utilizing network topology information to identify network nodes crucial for relaying traffic. The identified nodes are designated as cluster head nodes, while remaining nodes are designated as member nodes. Since cluster head nodes basically serve as relay nodes, the present invention removes the need for gateway type nodes. In other words, the present invention designates a minimum quantity of network nodes as cluster head nodes to achieve connectivity among the nodes. Since the present invention employs a deterministic approach, cluster formation remains substantially the same independently of the initial start-up sequence of network nodes. Further, the designation of cluster head nodes by the present invention is optimal since the designated nodes are crucial for relaying network traffic. Moreover, since the quantity of cluster head nodes that may facilitate communications depends upon the interval between node status packet transmissions, the present invention adaptively adjusts that interval to subsequently facilitate cluster formation independent of network size and varying start times of network nodes.

In addition, the present invention employs a cluster formation technique to form a three tier hierarchical network in order to apply the routing protocol to large scale networks. The cluster formation technique is applied to the cluster head nodes or backbone network to form third tier clusters. Nodes within the third tier distribute routing information from head node databases to reduce overhead traffic, while head nodes within the second tier are utilized for data routing. Further, the present invention reduces overhead traffic by eliminating transmission of acknowledgment messages in response to receipt of the database information. Basically, the present invention examines head node databases and requests third tier nodes to supply missing information. Thus, the present invention only sends request messages in response to receipt of the database information and discovering missing data within head node databases, thereby significantly reducing overhead traffic.

OBJECTS AND SUMMARY OF THE INVENTION

Accordingly, it is an object of the present invention to facilitate cluster formation in accordance with network topology information to minimize the quantity of hops for data transmission within the network.

It is another object of the present invention to form clusters within a network while designating a minimum quantity of cluster head nodes, thereby reducing the quantity of hops and overhead traffic for data transmission.

Yet another object of the present invention is to enable cluster formation independent of initial start times of network nodes.

Still another object of the present invention is to form an additional network hierarchical tier to transmit routing information from node databases throughout the network with reduced overhead traffic.

A further object of the present invention is to employ a three tier network architecture to facilitate transmission of routing information from node databases throughout the network with reduced overhead traffic.

The aforesaid objects may be achieved individually and/or in combination, and it is not intended that the present invention be construed as requiring two or more of the objects to be combined unless expressly required by the claims attached hereto.

According to the present invention, an exemplary wireless network includes a plurality of nodes arranged by the present invention into clusters with each cluster having cluster member nodes and a designated cluster head node. The nodes communicate with each other via a link-state type of routing protocol and may further communicate with other external networks in accordance with an internetworking protocol (e.g., a modified version of the conventional Open Shortest Path First (OSPF) routing protocol, or a Radio Open Shortest Path First (ROSPF) protocol). A database within each network node contains link information for that node. The present invention facilitates cluster formation within the network by utilizing network topology information to form clusters and designate cluster head nodes. This is accomplished by identifying nodes that are crucial for relaying traffic within the network and designating those nodes as cluster head nodes, while remaining network nodes are designated as member nodes. Further, the present invention adjusts a node status packet transmission rate or interval between successive node status packet transmissions to facilitate cluster formation independent of network size and varying initial start times of network nodes.

In addition, the present invention utilizes the above described cluster formation technique to form a three tier architecture for transmission or flooding of routing information from head node databases throughout the network. In particular, the cluster formation technique is applied to cluster head nodes to form an additional network tier of super nodes. These super nodes are responsible for distributing the routing information, while cluster head nodes route network data traffic. The databases of cluster head nodes are examined subsequent to flooding of head node database information by super nodes, where data missing from a head node database is requested from a corresponding super node, thereby eliminating transmissions of acknowledgment messages. Thus, the present invention achieves significant reduction in overhead traffic.

The above and still further objects, features and advantages of the present invention will become apparent upon consideration of the following detailed description of specific embodiments thereof, particularly when taken in conjunction with the accompanying drawings wherein like reference numerals in the various figures are utilized to designate like components.

BRIEF DESCRIPTION OF THE DRAWINGS

FIG. 1A is a diagrammatic illustration of network nodes according to the present invention arranged in an exemplary communication network.

FIG. 1B is a block diagram of a network node of FIG. 1.

DETAILED DESCRIPTION OF THE PREFERRED EMBODIMENTS

Figure 2:
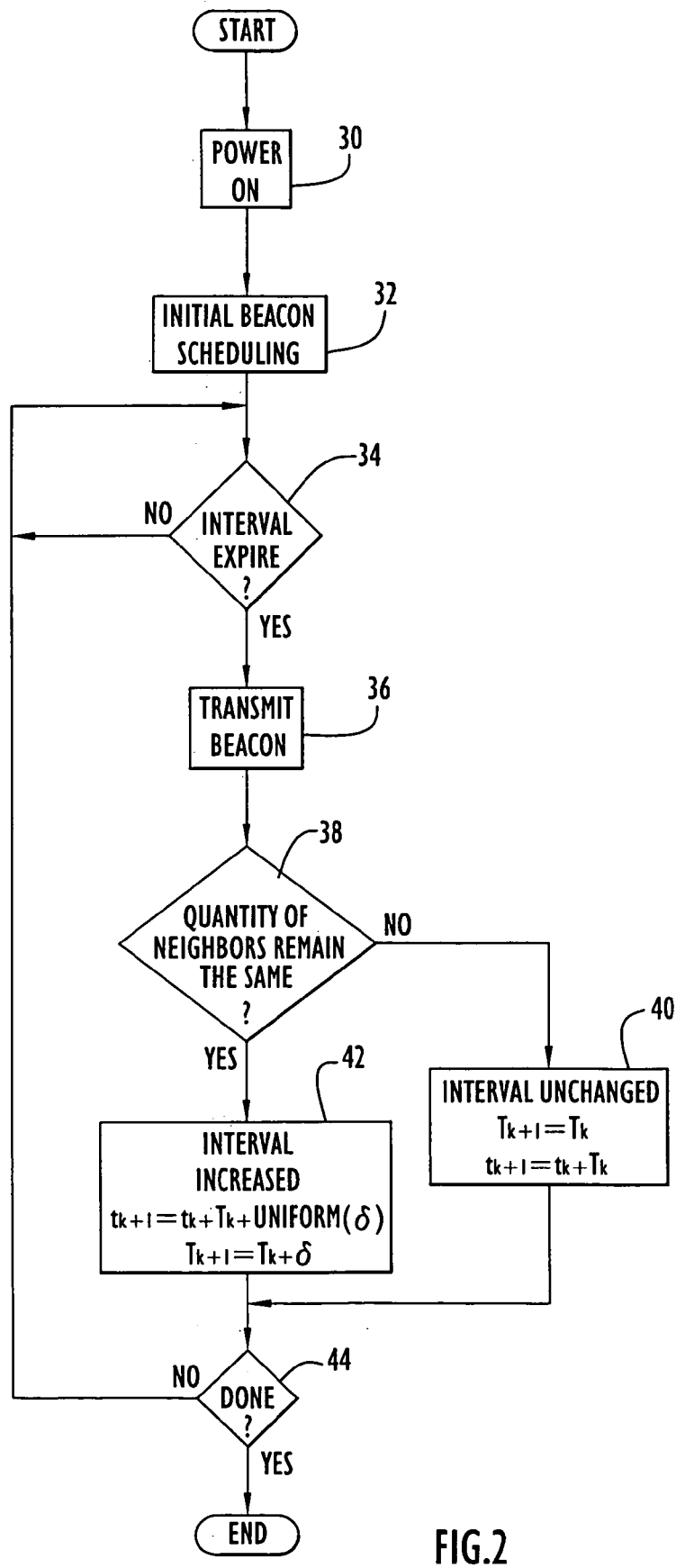
FIG. 2 is a procedural flow chart illustrating the manner in which a network node adjusts the interval between node status packet transmissions according to the present invention.

Network nodes according to the present invention arranged in an exemplary wireless network are illustrated in FIG. 1A. Specifically, wireless network 2 includes a plurality of nodes 10 arranged in cells or clusters 12 in accordance with cluster formation of the present invention as described below. Each cell or cluster includes corresponding cluster member nodes 10 with one of those cluster member nodes designated as a cluster head node 14. These cluster arrangements form a first tier of network 2 and facilitate communication within a cluster between the cluster head and member nodes preferably utilizing a first transmission frequency. The head nodes of each cluster are in communication with each other, preferably utilizing a second transmission frequency, and form a backbone network 16. The backbone network essentially forms a second tier of network 2 and facilitates communications between nodes of different clusters (e.g., generally providing communications over greater distances). The architecture of network 2 is similar to that of conventional cellular telephone systems, except that network 2 provides dynamic selection of cells and cluster head nodes as described below.

A network node 10 according to the present invention is illustrated in FIG. 1B. Specifically, node 10 includes a transmitter 22, a receiver 24 and a processor 26. The processor is preferably implemented by a conventional microprocessor or controller and controls the node to transmit and receive messages in accordance with the communication protocols described below. The transmitter is preferably implemented by a conventional transmitter and transmits messages from the processor, preferably in the form of radio frequency (RF) signals, in accordance with processor instructions. Receiver 24 is typically implemented by a conventional receiver and configured to receive signals, preferably in the form of radio frequency (RF) signals, transmitted by the transmitter of another node. The receiver receives transmitted signals and forwards the received signals to processor 26 for processing. The node further includes an identifier (e.g., a code or identification number) to identify the particular node and a database (not shown) to store information pertaining to neighboring nodes to facilitate cluster formation as described below. A present invention head node 14 is substantially similar to node 10 described above.

The network preferably employs a link-state type of routing protocol that is implemented on backbone network 16. The database of each head node 14 maintains information enabling that cluster head to determine appropriate paths for routing messages through the network. The information typically relates to links between the various network head nodes. The cluster head databases are synchronized in accordance with the routing protocol by transference of database update packets or messages between cluster head nodes that provide network connectivity information. These packets are conventionally transmitted to each neighboring network head node via plural unicast or point-to-point messages (e.g., messages from a source node to a specific destination network node) in response to changes in network topology, an external network connected to network 2 or other modifications to the network facilitating changes in a node database. When a database update packet is received, a point-to-point acknowledgment (ACK) packet is commonly transmitted to the source node from the destination node to indicate packet reception. In addition, each node (e.g., cluster head and member nodes) periodically broadcasts a beacon type or node status packet. This packet basically advertises the presence of a node within the network and is typically utilized by head nodes for "keep alive" and neighbor discovery purposes.

With respect to communications between network 2 and other external networks (e.g., the Internet), the network may employ a Radio Open Shortest Path First (ROSPF) protocol. This protocol is basically a modified version of the conventional Open Shortest Path First (OSPF) protocol commonly utilized for Internet Protocol (IP) type networks. Since the OSPF protocol generates significant overhead when applied to ad hoc networks (e.g., dynamic wireless networks without any routing infrastructure), such as network 2, that protocol has been modified to derive the ROSPF protocol suitable for use with wireless or radio networks. According to the ROSPF protocol, each node within network 2 maintains a routing database including information enabling the node to determine an appropriate path for routing a message to the external network. The information contained within the node routing databases typically relates to links between the various network nodes. The ROSPF protocol is a link-state type routing protocol and provides for synchronization of node routing databases through transmission of Link-State Advertisement (LSA) packets to each network node. These packets are conventionally transmitted to each neighboring network node via plural point-to-point messages (e.g., messages from a source node to a specific destination network node) in response to changes in network topology, an external network connected to network 2 or other modifications to the network facilitating changes in a node database. When a database update packet is received, a point-to-point OSPF type acknowledgment (ACK) packet is commonly transmitted to the source node from the destination node to indicate packet reception.

The arrangement of nodes 10 within clusters 12 and the designation of cluster head nodes 14 are dynamically determined by the present invention. Basically, the present invention facilitates cluster formation and adjustment of the interval between node status packet transmissions within wireless ad hoc type networks. Cluster formation facilitates arrangement of network 2 into clusters and designation of cluster head nodes to form backbone network 16. The present invention distributes processing in a manner that enables each network node to determine its status as a head or member node in accordance with local connectivity information received within node status packet transmissions from neighboring nodes as described below. Since the interval between node status packet transmissions is adjusted, the initial value for that interval is not critical to cluster formation. Generally, the initial interval between node status packet transmissions is set to a low value to form clusters rapidly. If the initial interval is set to a value below an acceptable range, the network becomes congested due to transmission of excessive quantities of node status packets. However, the present invention automatically increases that interval to relieve the congestion.

The manner in which a processor of a network node facilitates transmission of node status packets and adjustment of the interval between transmission of those packets according to the present invention is illustrated in FIG. 2. Initially, power is enabled to an unconfigured network 2 at step 30 and each network node periodically transmits node status packets at predetermined time intervals. The node status packets transmitted by each node include a payload or storage section containing information including the quantity of neighboring nodes associated with that node and a listing of those neighboring nodes. The quantity of this information typically increases as node status packets are received by a node and additional neighboring nodes are discovered. The node status packets are transmitted as a broadcast message to enable each node of a succeeding hop (e.g., nodes within one hop from the transmitting node) to receive the packets. Specifically, a node schedules beacon transmission using an initial value at step 32, and subsequently waits for the transmission time of a succeeding node status packet as determined at step 34. In other words, the network node transmits a node status packet 'k' (e.g., where k is generally an integer greater than or equal to zero) at time, $t_k$, and waits for expiration of a time interval, $T_k$, between time $t_k$ and the transmission time of a succeeding node status packet, $t_{k+1}$. The time interval between node status packet transmissions, $T_k$, is initially set to a generally low predetermined value and is adjusted in accordance with network conditions as described below. However, the time interval may be initially set to any desired value. The network node receives node status packets during transmission and processes the packets as described below to facilitate the interval adjustment.

In response to expiration of the time interval, a node status packet containing relevant neighbor information is transmitted by the network node at step 36. The node processor subsequently determines the appropriate interval between subsequent node status packet transmissions based on the quantity of neighboring nodes indicated within received node status packets. Basically, the quantity of neighboring nodes generally decreases or remains the same in the event that no additional neighbors are discovered, or that neighboring node status packet transmissions are lost due to transmission impairments. In order to enhance the probability of receiving the potentially lost node status packets, the interval between node status packet transmissions, $T_k$, is increased to provide sufficient time for reception of the packets. Specifically, when the quantity of neighboring nodes, $N_k$ (e.g., where N is an integer generally greater than or equal to zero), associated with the network node at a time, tk, is the same as the neighbor quantity, $N_{k-1}$, at a previous time, $t_{k-1}$, as determined at step 38, the time interval between transmission of node status packets by the network node, $T_k$, is increased at step 42. Accordingly, the time for transmission of a succeeding node status packet, $t_{k+1}$, may be expressed as follows:

$$t_{k+1}=t_k+T_k+\text{uniform }(\delta);$$

where the uniform function represents a uniform distribution. In other words, the transmission time of a succeeding packet, $t_{k+1}$, is determined from the transmission time of a current node status packet ($t_k$), a current interval between transmissions ($T_k$) and an offset ($\delta$). The offset, $\delta$, is utilized to coordinate node status packet transmissions of network nodes. Since simultaneous transmission of node status packets results in collisions, the node status packet transmission times are staggered among the network nodes to minimize collision occurrence. The offset, $\delta$, may be any desired value or function to achieve appropriate node status packet transmission times. The uniform function basically distributes the offset values among the nodes in an appropriate manner. The interval between node status packet transmissions of neighboring nodes is typically determined by the network node based on the frequency of reception of node status packets from those nodes. Thus, the network node may determine appropriate intervals for node status packet transmissions based on the current interval and intervals of neighboring nodes. Moreover, the time interval between transmission of succeeding node status packets, $T_{k+1}$, may be determined from the current interval ($T_k$) and the offset ($\delta$), and may be expressed as follows.

$$T_{k+1}=T_k+\delta.$$

If the quantity of neighbors, $N_k$, associated with the network node at a time, $t_k$, is not the same as the neighbor quantity, $N_{k-1}$, at a prior time, $t_{k-1}$, as determined at step 38, the time interval for succeeding node status packet transmissions, $T_{k+1}$, is not modified, and the transmission time, $t_{k+1}$, and interval, $T_{k+1}$, are respectively set at step 40 as follows:

$$t_{k+1}=t_k+T_k$$

$$T_{k+1}=T_k.$$

Thus, the transmission time of a succeeding packet, $t_{k+1}$, is determined based on the current transmission time ($t_k$) and time interval ($T_k$). Since additional nodes are in communication with the network node, this indicates that the interval is set to a reasonable value and, therefore, should remain unchanged. The above process is repeated until termination of node processing (e.g., power down or other event) as determined at step 44.

Figure 3:
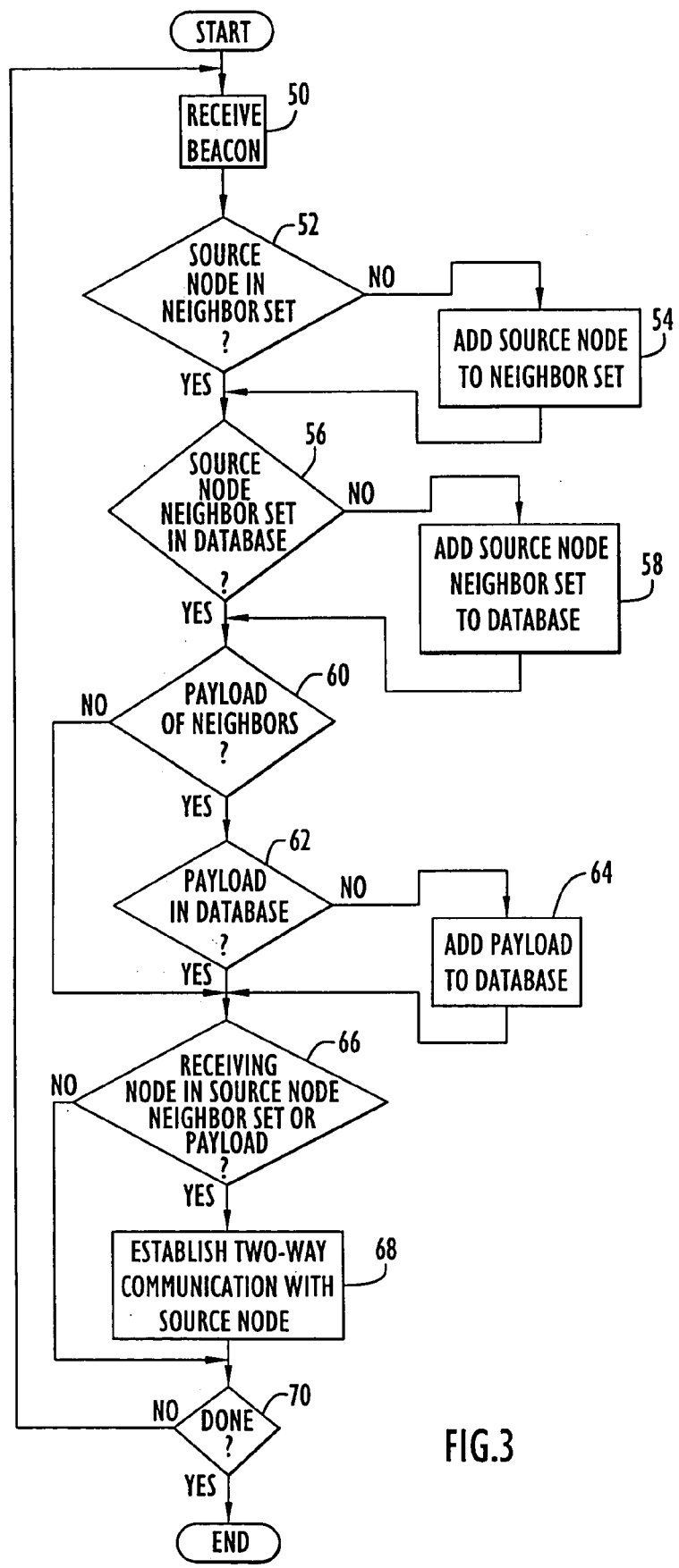
FIG. 3 is a procedural flow chart illustrating the manner in which a network node receives and processes node status packets according to the present invention.

The manner in which a processor of a network node facilitates reception and processing of node status packets transmitted by neighboring nodes is illustrated in FIG. 3. Initially, each node includes a database that stores information associated with neighboring nodes from which node status packets are received. The database basically maintains a plurality of neighbor sets, S, each including the corresponding node and neighbors from which that node receives node status packets. Thus, the database of a node having 'P' neighbors (e.g., where P is generally an integer greater than or equal to zero) includes P+1 neighbor sets (e.g., a set for the node and individual sets for each of P neighbors). Specifically, the network node receives a node status packet from a neighboring node at step 50. If the neighboring node is not included within the network node neighbor set as determined at step 52, the neighboring node is added to that set at step 54. When the network node database does not include a neighbor set corresponding to the neighboring node as determined at step 56, that neighbor set is created at step 58. Since node status packets typically include neighbor information as described above, the neighbor information within the received node status packet is examined by the network node processor at step 60 to determine whether or not neighbors identified within the received packet are included within the neighbor set associated with the neighboring node. If each identified neighbor is not present within the associated neighbor set, that neighbor set is updated to include the missing neighbors at step 64.

In response to determining at step 66 that the network node is identified within the neighbor set associated with the neighboring node or within the neighbor information of the node status packet, the network node establishes two-way communication with the neighboring node at step 68. The above process is repeated until termination of node processing (e.g., power down or other event) as determined at step 70.

Figure 4:
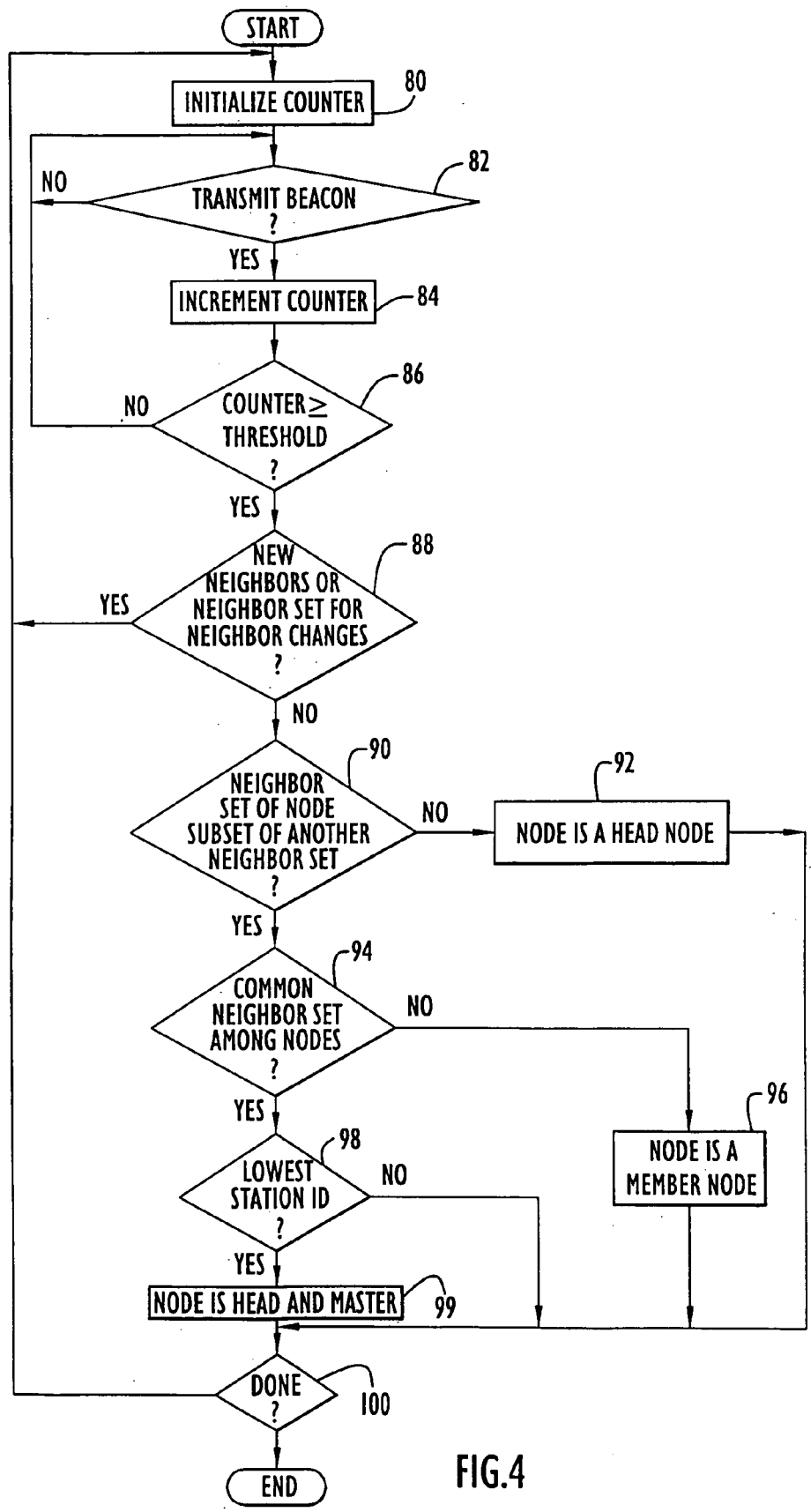
FIG. 4 is a procedural flow chart illustrating the manner in which a network node determines head or member status to facilitate cluster formation according to the present invention.

The manner in which a processor of a network node determines head or member status of that node to facilitate cluster formation is illustrated in FIG. 4. Initially, cluster formation is distributed among network nodes where each node determines its status as a head or member node. Node status is basically determined by each node subsequent transmission of a predetermined quantity of node status packets by that node and in response to no new neighbors being discovered and no changes within neighbor sets occurring during the node status packet transmissions. Specifically, a node status packet counter is initialized by the network node processor at step 80. The network node transmits node status packets including corresponding neighbor information at appropriate times and adjusts the interval between those transmissions as described above. In response to transmission of a node status packet as determined at step 82, the counter is incremented at step 84. If the counter is below a predetermined threshold as determined at step 86, thereby indicating that the predetermined quantity of node status packets has not been transmitted, the network node continues to monitor transmission of node status packets and increment the counter as described above.

When the packet counter accumulates a value greater than or equal to the predetermined threshold, thereby indicating transmission of a sufficient quantity of node status packets, the node processor determines at step 88 whether or not new neighbors have been discovered or a neighbor set has changed. If either of these conditions has occurred during transmission of the node status packets, the counter is re-initialized at step 80 and the processor basically waits for the occurrence of appropriate conditions (e.g., no new neighbors and no changes within neighbor sets) within succeeding sessions of node status packet transmissions (e.g., intervals where the predetermined quantity of node status packets are transmitted) as described above. The predetermined quantity of node status packet transmissions may be set to any desired value.

Once a session of node status packet transmissions occurs without discovering a new neighbor and without changes in neighbor sets, the node processor determines at step 90 whether or not a neighbor set associated with the network node is a subset of a neighbor set of any neighboring nodes. The neighbor sets for this determination are stored within the network node database as described above. In other words, the processor determines for the neighbor set, S, associated with the network node the presence of a neighbor set, $S_m$, associated with another node 'm' that satisfies the condition of $S \subset S_m$, where m is generally an integer from one to the quantity of neighboring nodes. If the neighbor set associated with the network node is not a subset of any neighbor sets of neighboring nodes, this indicates that there exist some nodes within the associated neighbor set that may only establish communications through the network node. Thus, the network node is crucial to relay traffic and is designated as a head node at step 92.

If the neighbor set associated with the network node is a subset of a neighbor set of a neighboring node, the node processor determines at step 94 if there exists a common neighbor set associated with the network node and each of the neighboring nodes (e.g., each neighbor set associated with the network node or neighboring nodes is equivalent to each other). In other words, the processor determines the presence of a neighbor set, C, equivalent to each neighbor set, $S_i$, in the network node database, where 'i' is generally an integer from one to a quantity of nodes including the network node and its neighboring nodes. This basically occurs in the event of a flat network architecture of fully connected nodes where each node has the same neighbors, thereby producing equivalent neighbor sets. When there is no common neighbor set, this indicates that the neighbor set associated with the network node is a subset of another neighbor set as described above. Thus, the neighbors of the network node may facilitate communications through the node associated with that other neighbor set. Accordingly, the network node is not crucial to relay traffic and is designated as a member node at step 96.

When a common neighbor set exists as determined at step 94, the node with the lowest identifier is designated as a head node and a master node at step 98. The master node determines the head or member node status of the remaining nodes. The head nodes are selected to have a predetermined quantity of member nodes associated with each head node. For example, if 'Q' (e.g., where Q is an integer generally greater than zero) member nodes are to be associated with each head node, the master node designates a head node for each group of Q+1 nodes. The master node informs nodes of their head node status, while remaining nodes are designated as members.

Once status has been determined for network nodes as described above, the head nodes inform corresponding member nodes of the head node designations. This is typically accomplished by the head nodes transmitting status information within the node status packets. When a member node receives node status packets indicating that more than one neighboring node is designated as a head node, the member node may determine the particular head node to utilize for communications based on any desired criteria (e.g., strongest signal, etc.). The above process is repeated until termination of node processing (e.g., power down or other event) as determined at step 100. The network continually adjusts the interval between node status packet transmissions and performs cluster formation in response to appropriate conditions as described above.

Figure 5:
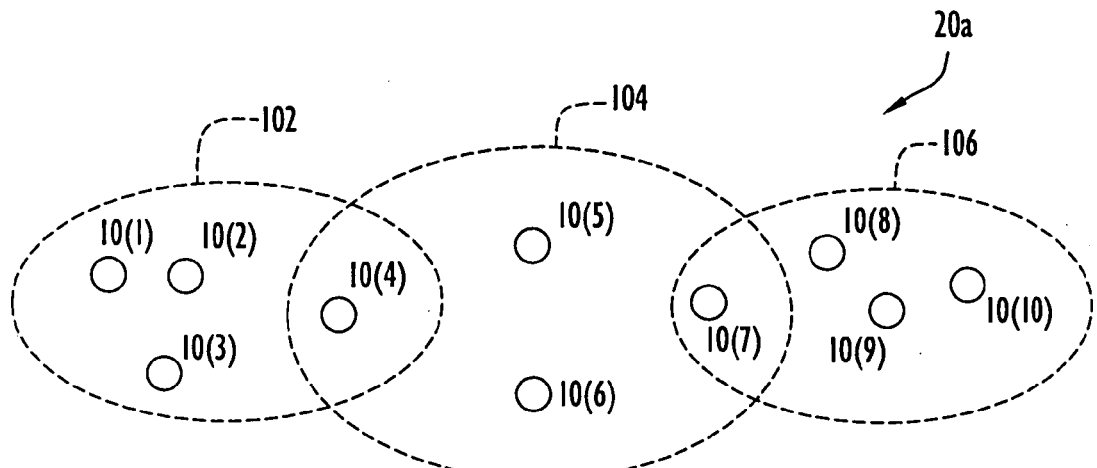
FIG. 5 is a diagrammatic illustration of an exemplary configuration of network nodes and corresponding clusters formed in accordance with the present invention.

Cluster formation in accordance with the present invention is described with reference to an exemplary network illustrated in FIG. 5. Specifically, a network 20a includes nodes 10(1)–10(10) each substantially similar to the nodes described above and arranged with nodes 10(1)–10(4), 10(4)–10(7) and 10(7)–10(10) respectively in communication with each other and disposed within areas 102, 104, 106. However, node sets 10(1)–10(3), 10(5)–10(6) and 10(8)–10(10) lack connectivity between those areas. Since node 10(4) is disposed within areas 102 and 104 and node 10(7) is disposed within areas 104 and 106, these nodes are crucial to relay traffic between areas and, therefore, are designated as head nodes. Further, nodes 10(4) and 10(7) are the minimum quantity of nodes that should be selected as head nodes to facilitate communications among network nodes. The remaining nodes (e.g., 10(1)–10(3), 10(5)–10(6) and 10(8)–10(10)) are designated as member nodes.

The neighbor sets associated with each node of exemplary network 20a are as follows:

$$B_{update} = (N-1) + (N-1)(N-2) = (N-1)(N-2+1)$$

$$(N-1)^2.$$

where the subscript of a set 'S' and the corresponding set elements are in the form of reference numeral indices to refer to a corresponding node. For example, '$S_1$' represents the neighbor set associated with node 10(1), while a set element '2' refers to node 10(2). The database of each node includes the neighbor set of that node and the neighbor sets of neighboring nodes. Byway of example, the database of node 10(1) includes neighbor sets $S_1$, $S_2$, $S_3$ and $S_4$.

Each neighbor set basically includes the associated node and the neighboring nodes from which the particular node receives node status packets. For example, since node 10(1) is in communication with nodes 10(2), 10(3) and 10(4) as described above, the corresponding neighbor set, $S_1$, includes nodes 10(1), 10(2), 10(3) and 10(4). The head or member status of node 10(1) is determined by that node based on neighbor sets of the nodes within set, $S_1$, or sets $S_1$, $S_2$, $S_3$ and $S_4$. Since neighbor set $S_1$ is a subset of neighbor set $S_4$, node 10(1) is not crucial to relay traffic and is designated as a member node. In other words, the nodes within set $S_1$ may also receive packets from node 10(4), thereby indicating that node 10(1) is not crucial to relay traffic.

The status of node 10(4) is determined by that node based upon neighbor sets of the nodes within set $S_4$, or sets $S_1$, $S_2$, $S_3$, $S_5$, $S_6$ and $S_7$. Since set $S_4$ is not a subset of the neighbor sets of the remaining nodes with that set, this indicates that there exist some nodes within set $S_4$ that may only establish communications through node 10(4) and, therefore, node 10(4) is crucial to relay traffic and is designated as a head node. Similarly, node 10(7) determines, in the manner described above for node 10(4), that some nodes within associated neighbor set $S_7$ may only facilitate communications through node 10(7) and, therefore, node 10(7) is crucial to relay traffic and designates its status as a head node. The remaining nodes within network 20a determine their status in substantially the same manner described above. The present invention identifies nodes 10(4) and 10(7) as head nodes, thereby designating the minimum quantity of head nodes and providing a minimum quantity of hops for data transmission. The minimum hop quantity further serves to maximize message completion rate and minimize network latency. The network nodes perform the above determination based on the neighbor information received within node status packets and stored in the respective node databases as described above.

Figure 6:
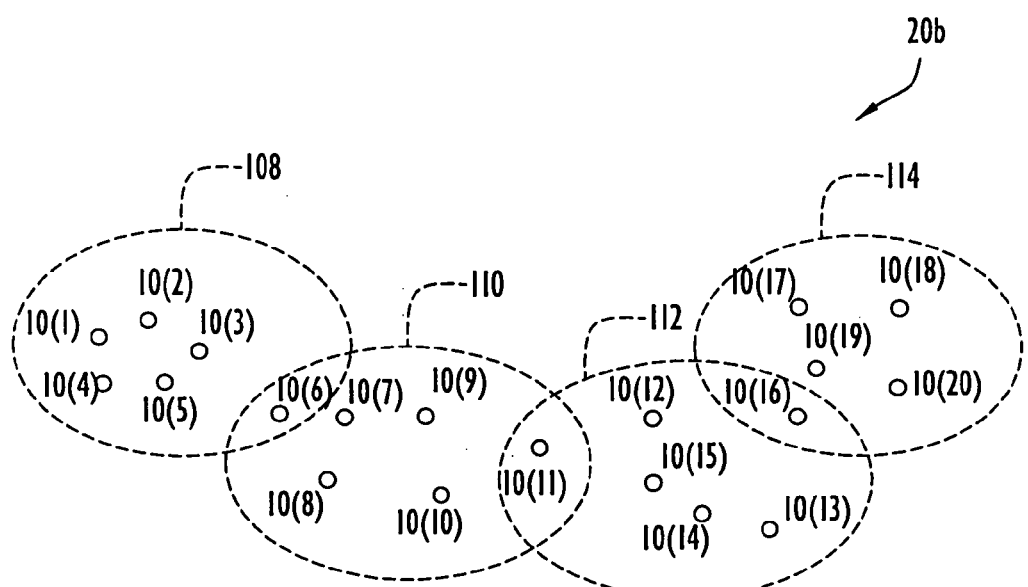
FIG. 6 is a diagrammatic illustration of an exemplary alternative configuration of network nodes and corresponding clusters formed in accordance with the present invention.

Performance of the present invention has been measured with reference to an exemplary network configuration illustrated in FIG. 6. Specifically, network 20b includes nodes 10(1)–10(20) each substantially similar to the nodes described above and arranged with nodes 10(1)–10(6), 10(6)–10(11), 10(11)–10(16) and 10(16)–10(20) respectively in communication with each other and disposed within areas 108, 110, 112 and 114. Nodes 10(6), 10(11) and 10(16) should be designated as head nodes, while remaining nodes within network 20b should be designated as member nodes. The present invention designates nodes 10(6), 10(11) and 10(16) as head nodes without regard to the generally random sequence of node activation. In contrast, the techniques of the related art described above produce sub-optimal results. For example, the lowest node identifier scheme designates at least four cluster head nodes each associated with a respective area 108, 110, 112, 114. Further, that technique requires designation of gateway nodes to route traffic, whereas the present invention provides head node status to nodes that are crucial for relaying traffic, thereby eliminating the necessity of gateway nodes.

In addition, the above-described scheme dependent upon node activation generates different cluster formations with varying start-up sequences. In order to produce results for this scheme, a simulator employing a random number generator is utilized to simulate network behavior. The random number generator produces a random number that is associated with a particular node. Thus, corresponding nodes are initiated in accordance with the output of the random number generator to simulate the generally random nature of network node initiation. The random number generator utilizes a base number or seed to produce a sequence of random numbers where variations in the seed alter the sequence of random numbers. Results of cluster formation by the above described node initiation scheme for varying seeds are illustrated in Table I below.

TABLE I

| SEED | HEADS |
|---|---|
| 123127 | 5, 7, 8, 10, 11, 12, 16, 17 |
| 3127 | 3, 4, 5, 6, 7, 11, 12, 16, 19 |
| 9857 | 4, 7, 8, 10, 11, 13, 16, 20 |

The head nodes indicated in the table are in the form of reference numeral indices to refer to corresponding nodes. Thus, by way of example, a head node '4' in the table refers to node 10(4). As shown above in Table I, the scheme designates a significantly greater quantity of cluster heads than the present invention, where the cluster heads are not optimal or crucial for routing traffic. Further, this scheme generates different cluster formations with varying seeds or node initiation sequences, thereby being dependent upon those sequences for cluster formation.

Figure 7:
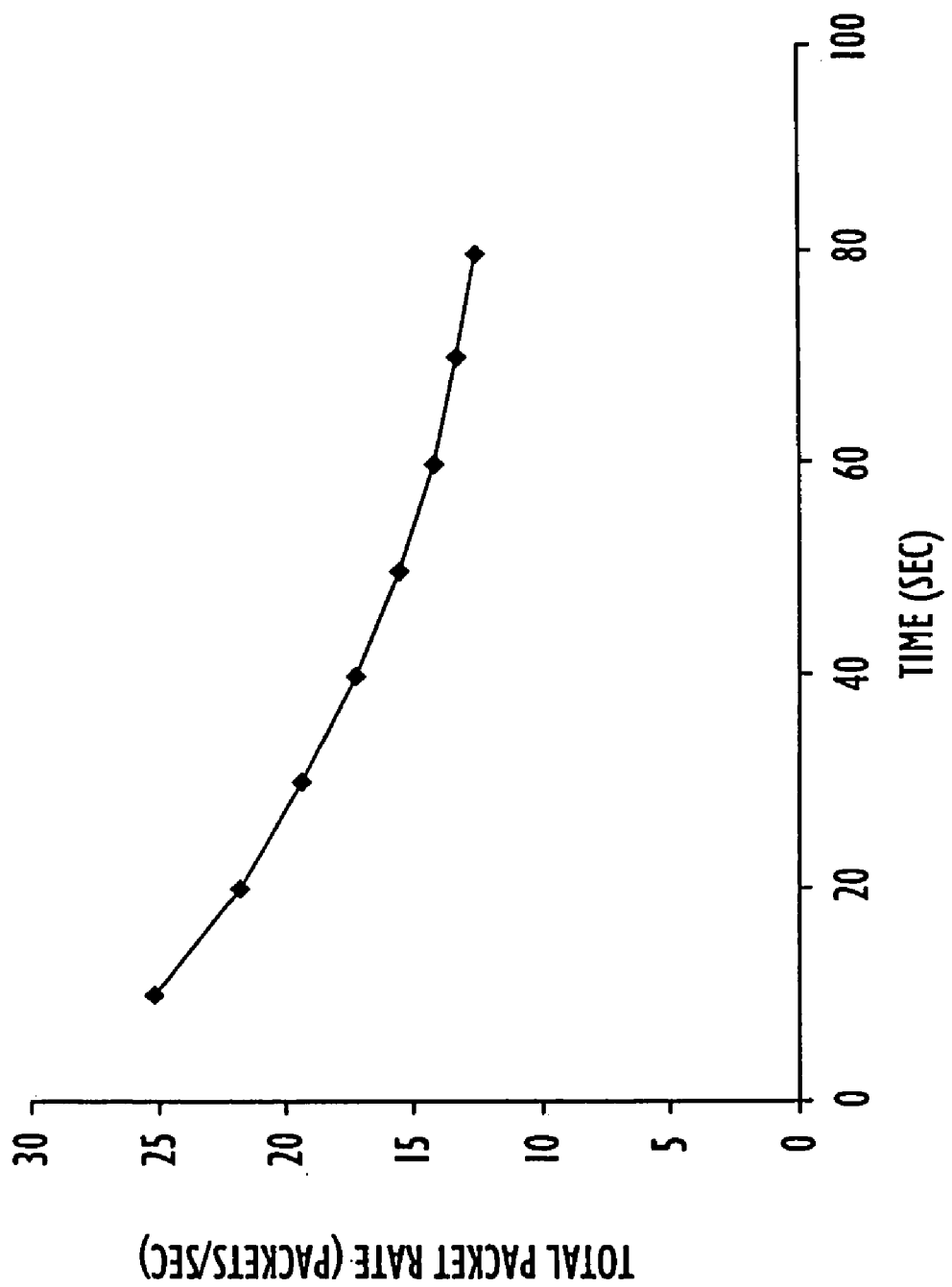
FIG. 7 is a graphical illustration of the relationship between network packet rate and time for an exemplary network configuration employing cluster formation and adjustment of the interval between node status packet transmissions in accordance with the present invention.

The performance of adjustment of the interval between node status packet transmissions has been measured on an exemplary network of one-hundred nodes randomly distributed in an area of twenty kilometers by twenty kilometers and having a radio range of approximately ten kilometers. Initially, each network node starts within a period of approximately four seconds. Subsequently, the interval between node status packet transmissions is adjusted in the manner described above. The relationship between packet rate of the network and time is illustrated in FIG. 7. The total packet rate is defined to be the total quantity of node status packets transmitted divided by the elapsed time. As shown in FIG. 7, the packet rate is initially high and decreases with an increased interval to avoid collisions. Once the interval settles, cluster formation is initiated. The present invention designates twenty-two head nodes and seventy-eight member nodes for the network. The node initiation scheme described above cannot form clusters for this network since the network nodes start at approximately the same time. The present invention has been further applied to various network configurations having approximately one-hundred to three hundred fifty nodes. In each case, cluster formation was achieved even during conditions of each node starting at approximately the same time (e.g., starting within four seconds).

Figure 8:
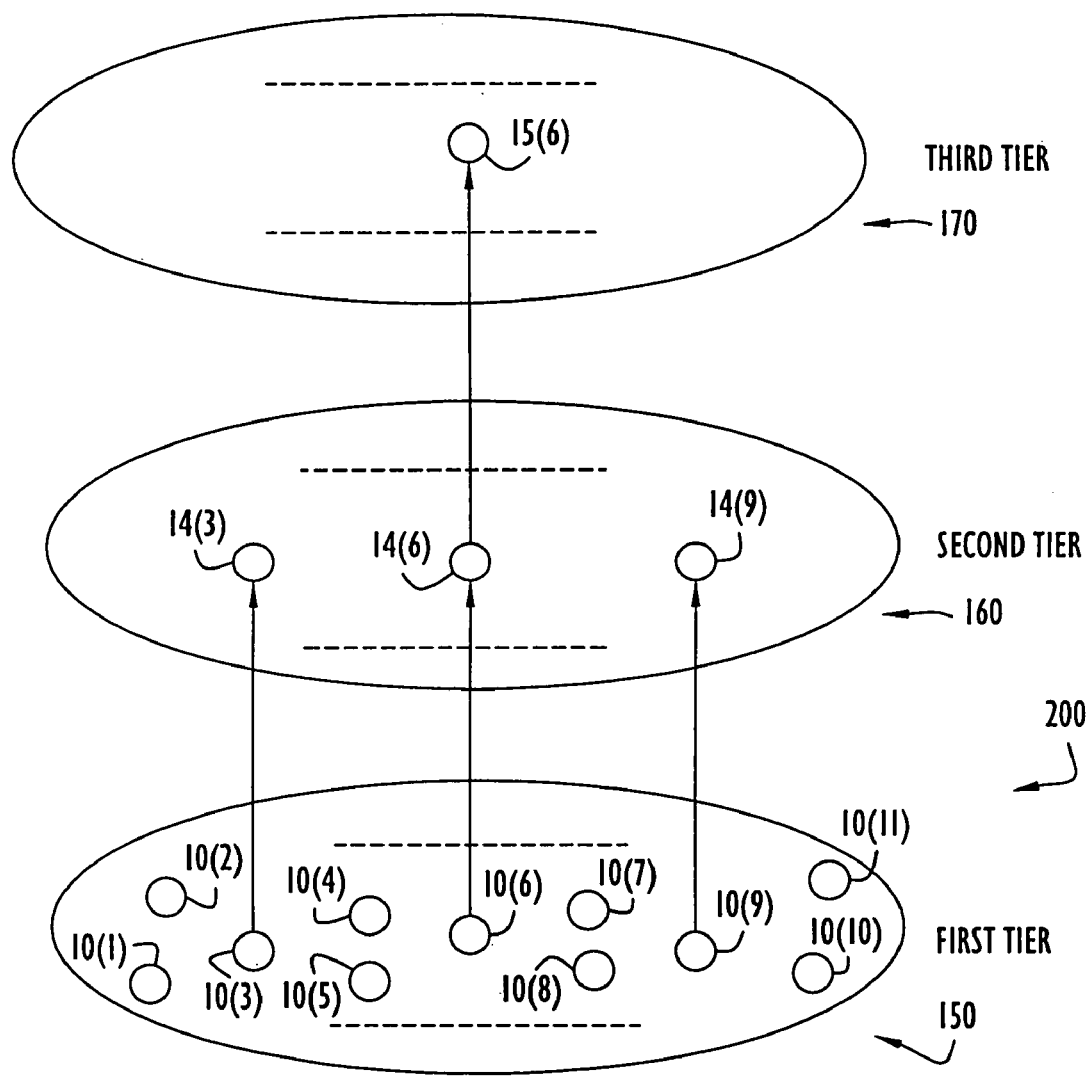
FIG. 8 is a diagrammatic illustration of an exemplary network having multiple tiers according to the present invention.

Typically, the cluster arrangement of a network affects overhead traffic, where the amount of overhead traffic generally depends on the degree of optimal cluster formation. For example, a cluster formation technique that designates an excessive quantity of cluster head nodes severely affects overhead traffic and routing performance. In order to reduce overhead traffic within a network, the clustering technique described above is further applied to a backbone network of head nodes to form an additional tier of super nodes as illustrated in FIG. 8. Specifically, an exemplary network 200 includes nodes 10(1)–10(11) each substantially similar to node 10 described above. Cluster formation is initially performed by the network nodes to determine head node status in substantially the same manner described above. This same clustering procedure is subsequently performed by head nodes to determine super node status. Once the head node clustering is performed, the network includes an additional tier of super nodes. By way of example, nodes 10(1)–10(11) of network 200 are initially within a first tier 150. Cluster formation is performed by the first tier nodes where nodes 10(3), 10(6) and 10(9) are designated as head nodes 14(3), 14(6) and 14(9). These head nodes form a second tier 160 where each node within that tier is a head node. The head nodes of tier 160 perform cluster formation as described above and node 14(6) is designated as a super node 15(6). The super node forms a third tier 170. When formation of the super node tier commences, a database within each second tier head node includes information relating to connectivity of its neighboring head nodes. In other words, a database of a head node that has 'L' neighboring head nodes (e.g., where L is an integer generally greater than zero) includes the neighbor sets, $H_i$, where 'i' is generally an integer from one through L+1 (e.g., neighbor sets for the particular head node and each of its L neighboring head nodes). The neighbor sets include the associated head node and neighboring head nodes from which the particular head node receives node status packets. The head nodes initially receive this connectivity information from their neighboring nodes within node status packets as described above. The super node includes information relating to connectivity of its corresponding neighboring head and super nodes at termination of third tier formation.

Figure 9:
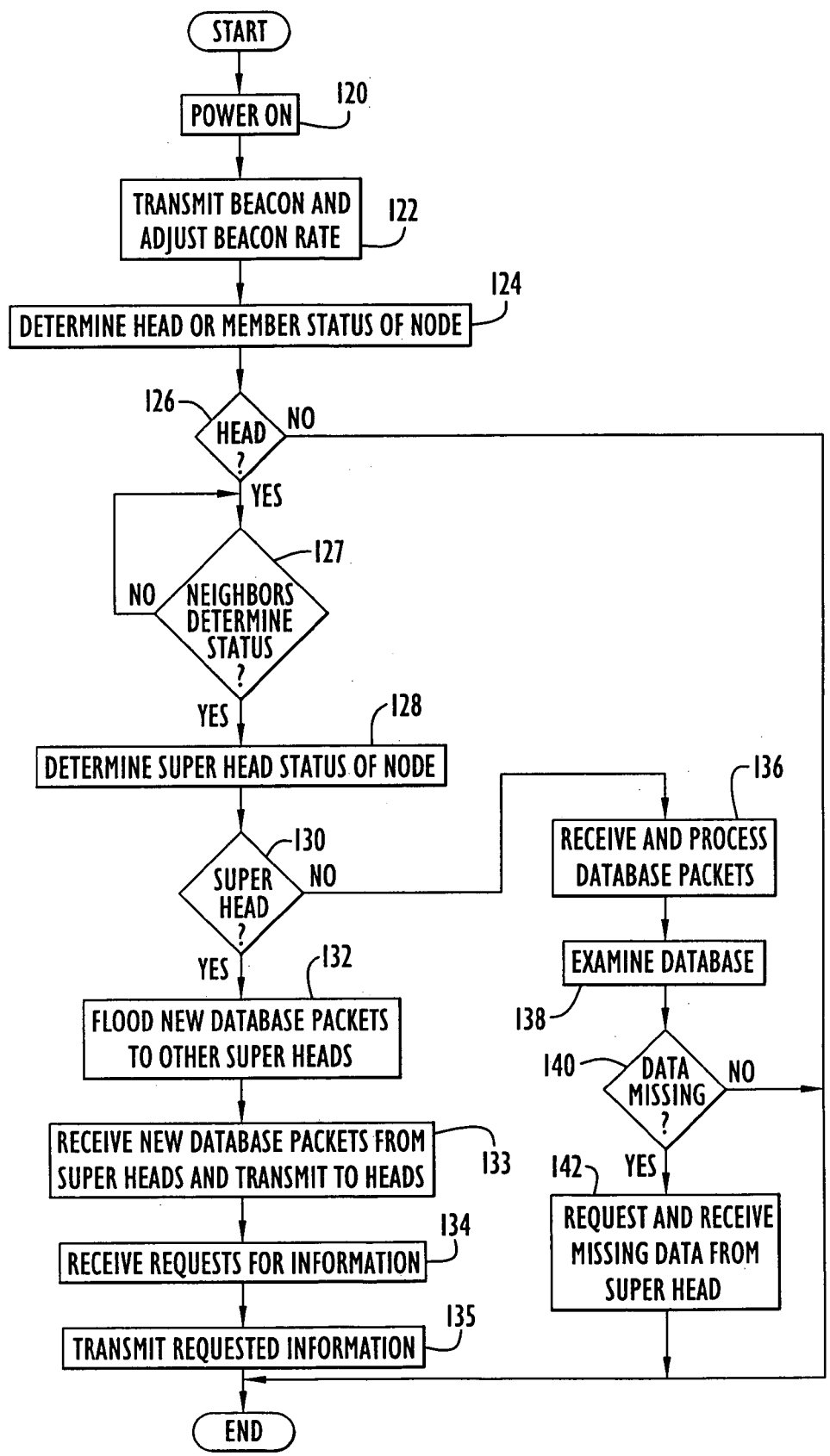
FIG. 9 is a procedural flow chart illustrating the manner in which a network node performs clustering and determines super node status to form a multiple tier network configuration according to the present invention.

The manner in which a processor of a network node determines its status to facilitate multiple tier cluster formation is illustrated in FIG. 9. Specifically, power is enabled to the network at step 120 and the network node transmits and receives node status packets and adjusts the interval between those transmissions at step 122 in substantially the same manner described above for FIGS. 2–3. Once the appropriate conditions have occurred (e.g., no new neighbors and no neighbor set changes have occurred within an interval of a predetermined quantity of node status packet transmissions), the network node determines its status as a head or member node at step 124 in substantially the manner described above for FIG. 4.

Subsequent node status determination, the node processor determines at step 126 whether or not the network node is designated as a head node. If the network node is designated as a head node, the node processor determines at step 127 whether or not each node within neighbor sets of neighboring nodes has determined its status as a head or member node. Basically, the database of a node having 'W' neighboring nodes (e.g., where W is an integer generally greater than zero) includes the neighbor sets, $S_j$, where j is an integer from one to W+1 (e.g., neighbor sets for the particular node and each of its W neighboring nodes). Cluster formation with respect to network head nodes may commence by a head node when the head or member status of each node within sets, $S_j$, is determined. Initially, an additional head link database is constructed by each head node and includes information relating to cluster head node connectivity. For example, the head link database of a head node having 'L' neighboring head nodes (e.g., where L is an integer generally greater than zero) from which the cluster head node may receive transmissions, includes neighbor sets, $H_i$, where 'i' is generally an integer from one through L+1 (e.g., neighbor sets for the particular head node and each of its L neighboring head nodes). The neighbor sets include the associated head node and neighboring head nodes from which the particular head node receives node status packets as described above. The super node status of the network node is determined at step 128 in response to the nodes within the neighbor sets determining their status. Super node status of the network node is determined in substantially the same manner as the determination of head node status described above for FIG. 4. The super nodes basically inform corresponding head nodes of the super node designations by transmitting status information within node status packets in substantially the same manner described above for head node notification. Further, when a head node receives information indicating that more than one neighboring node is a super node, the head node may determine the particular super node to utilize for communications based on any desired criteria (e.g., signal strength, etc.) in substantially the same manner described above for member nodes selecting a head node.

A flooding process occurs after formation of the super node tier and is initiated by the super nodes. Basically, flooding is the process where each head node receives routing information from other network head nodes to synchronize head link databases. Thus, the head link database of each head node includes information relating to the connectivity of head nodes within the network in response to completion of the flooding process. In particular, the network node floods a database update packet to other network super nodes at step 132 in response to determining that the network node is a super node at step 130. The flooding may be accomplished by a unicast or broadcast technique. Specifically, a unicast technique includes each super node transmitting routing or connectivity information from its head link database or any newly received connectivity information to each corresponding neighboring super node via unicast or point-to-point messages. Since the head link database of each super node includes connectivity information of its corresponding neighboring head nodes, the head link database of each super node contains information relating to connectivity of each network head node at completion of the flooding process. The information transmitted by a super node is received by neighboring super nodes that each forward the information via unicast or point-to-point messages to head nodes associated with that super node. Since each head node contains connectivity information relating to each of its neighboring head nodes (e.g., including its corresponding super node), the super nodes need to transmit to their associated head nodes only the information received from neighboring super nodes. The unicast technique facilitates transmission to a destination with minimum power for nodes that may adapt transmission power. Further, since this technique requires a channel to be cleared prior to transmission, the possibility of collisions is reduced. However, this technique transmits a packet for each destination, thereby providing significant overhead traffic for large networks and increasing the likelihood of collisions.

As discussed above, the unicast technique basically transmits packets among super nodes and subsequently floods those packets from super nodes to associated head nodes. The broadcast technique basically includes super nodes flooding connectivity information from their head link database or any newly received connectivity information to each of their super node or head node neighbors. Thus, the super nodes may transmit to any neighbors regardless of super node status. Although the broadcast technique transmits without adaptive power adjustment or a guarantee of a clear channel, this technique provides significant reduction of overhead traffic. For example, one broadcast packet transmission is required to flood connectivity information for a super node having 'Y' associated head nodes (e.g., where Y is generally an integer greater than zero), whereas Y packet transmissions are required by the unicast technique.

Once connectivity information is transmitted by super nodes, the network node in response to being designated a super node, receives the information at step 133 and forwards the information to its associated head nodes. The associated head nodes update their head link databases with the transmitted information and determine whether or not further information is required as described below. If additional information is required, the head nodes transmit requests to the network node to provide the requested information. Accordingly, the network node receives requests for information from associated head nodes at step 134. The requests are processed by the network node and the information is transmitted via a unicast or point-to-point message to the requesting head node at step 135. The requesting node receives the information and updates its head link database to contain a complete description of head node connectivity.

Once flooding has been accomplished, each head node should contain sufficient information to perform clustering and route packets. However, in order to ensure the integrity of head link databases, each head node examines its head link database for missing information. Accordingly, in response to the node processor determining at step 130 that the network node does not qualify as a super node, the network node receives and processes database update packets from a corresponding super node at step 136. The network node processes these packets in order to update its head link database. Once the flooding is complete, the network node examines its head link database for missing information at step 138. This is accomplished by examining neighbor sets within that database. In particular, each head link database should contain neighbor sets, $D_i$, where 'i' is an integer from 1 through 'Z', and Z is generally an integer greater than zero and represents the quantity of head nodes in the network. The neighbor sets include the associated head node and neighboring head nodes from which the particular head node receives node status packets as described above. The network node examines each neighbor set $D_i$ within the head link database to uncover a set element or neighboring head node for which the head link database does not include a corresponding neighbor set, thereby indicating that the database is incomplete. For example, if node 14(9) (FIG. 8) is determined to be an element of the set, $D_5$, the network node examines the head link database for the neighbor set, $D_9$, associated with node 14(9). When set $D_9$ is not within the database, the database is incomplete and the network node ascertains the missing information.

In response to determining at step 140 that the database lacks information, the network node requests its corresponding super node to provide the missing information at step 142. The request is processed by the super node and the information is provided to the network node as described above. The head link database of the network node is updated with the information to provide a complete description of head node connectivity. This technique eliminates the need for head nodes to acknowledge receipt of packets from the corresponding super node. Since numerous acknowledgment packets may be transmitted, especially in the case where a super node has several associated head nodes, the amount of overhead traffic is significantly reduced. In certain systems, an acknowledgment is incorporated into the routing protocol for a unicast message. Accordingly, a head node does not need to repeat the acknowledgment to a super node. However, with respect to a broadcast technique, an acknowledgment is typically transmitted to ensure reliability.

Figure 10:
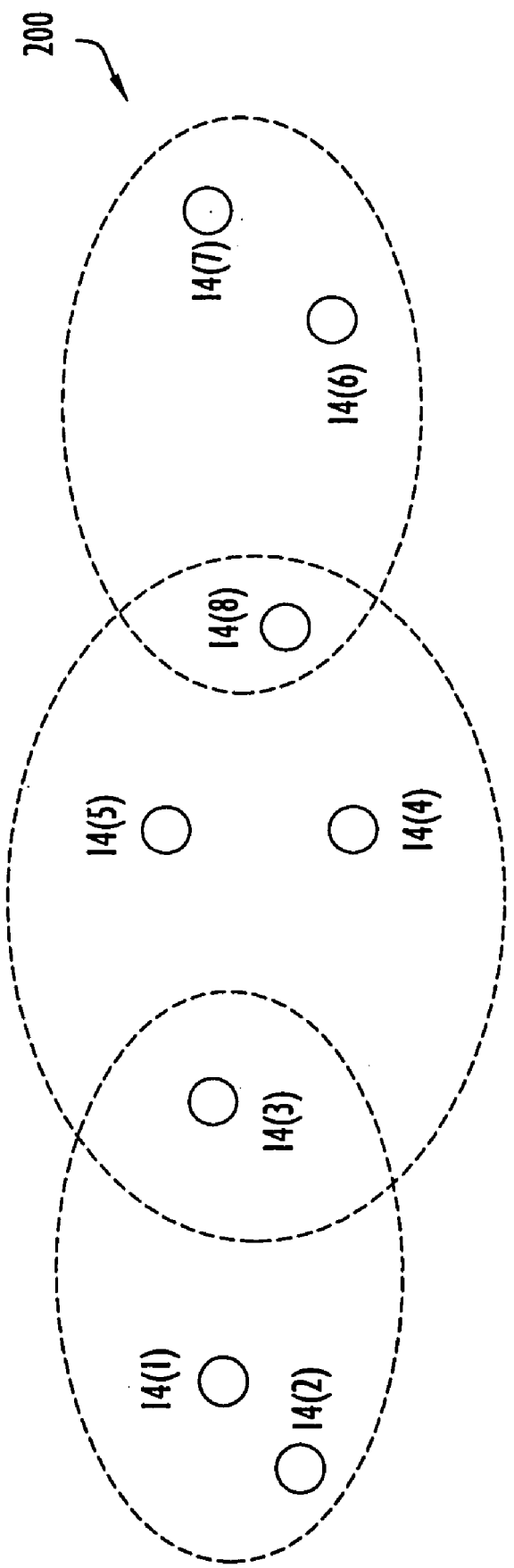
FIG. 10 is a diagrammatic illustration of an exemplary configuration of cluster head nodes and corresponding clusters formed in accordance with the present invention.

Operation of the multiple tier architecture of the present invention is described with reference to an exemplary network configuration illustrated in FIG. 10. Initially, network 200 includes head nodes 14(1)–14(8) each substantially similar to nodes 14 described above and associated with corresponding member nodes (not shown). Network nodes 14(1)–14(8) have been designated as head nodes in the manner described above and form a second tier of network 200. The cluster formation technique described above is applied to the head nodes resulting in head nodes 14(3) and 14(8) being designated as super nodes. The super nodes flood routing information to synchronize head link databases as described above, where the head link database of each head node should contain the following information or neighbor sets.

$S_1 = \{1, 2, 3, 4\}$   $S_2 = \{1, 2, 3, 4\}$   $S_3 = \{1, 2, 3, 4\}$ $S_4 = \{1, 2, 3, 4, 5, 6, 7\}$   $S_5 = \{4, 5, 6, 7\}$   $S_6 = \{4, 5, 6, 7\}$ $S_7 = \{4, 5, 6, 7, 8, 9, 10\}$   $S_8 = \{7, 8, 9, 10\}$   $S_9 = \{7, 8, 9, 10\}$ $S_{10} = \{7, 8, 9, 10\}$

The subscript of set D and set elements represent reference numeral indices and refer to particular head nodes. For example, '$D_1$' represents the neighbor set associated with head node 14(1), while an element '2' refers to head node 14(2).

Once flooding is accomplished by super nodes 14(3) and 14(8), the head link database of each head node 14(1)–14(2) and 14(4)–14(7) is examined for completeness. By way of example only, node 14(1) examines its database and discovers that node 14(5) is an element of neighbor sets $D_3$, $D_4$ and $D_8$ respectively associated with head nodes 14(3), 14(4) and 14(8). However, the neighbor set associated with node 14(5) is not within the database of node 14(1). Accordingly, node 14(1) transmits a request to corresponding super node 14(3) to provide the missing information. If additional information relating to a particular node is missing, this indicates that the node has a system failure or has moved out of range. For example, when the database of node 14(1) further lacks sets $D_5$, $D_3$, $D_4$ and $D_8$ respectively associated with uncovered node 14(5) and its neighboring head nodes 14(3), 14(4) and 14(8), node 14(5) typically has a system failure or has moved out of range.

Conventional techniques, such as the OSPF protocol, designate a particular router to transmit a broadcast message to neighboring routers as described above. The neighboring routers each transmit an acknowledgment message to the designated router in response to receiving the broadcast message. When the designated router does not receive a response from a neighboring router within a predetermined time interval, the broadcast message is re-transmitted via the unicast technique to the router not acknowledging the message. However, the present invention eliminates the requirement of transmitting an acknowledgment message, while providing a manner for head nodes to receive missing information from super nodes, thereby reducing overhead traffic. Once initial flooding and database examination are complete, each head node contains information sufficient to route messages. Super nodes handle flooding of database update packets, while head nodes provide routing functions for the network. When changes in network connectivity or other events occur that modify a head link database, new information is flooded to the head nodes to synchronize their head link databases. This is accomplished by a head node transmitting the information to a corresponding super node which subsequently floods the information as described above. This technique may be further utilized to flood database or other information (e.g., internal network routing protocol, ROSPF packets, etc.) to head and/or member nodes throughout the network. The present invention continually adjusts network configuration and designates head nodes and super nodes in response to appropriate network conditions as described above. This enables the network to adapt to changing conditions (e.g., units moving between clusters or unit movement causing a current configuration to be sub-optimal) and provide a relatively optimal configuration for routing traffic.

The present invention may employ alternative techniques to reduce overhead traffic. In particular, broadcast messages may include information from plural database update packets and be transmitted at particular times to reduce overhead traffic. For example, when a super node receives new database information in the form of database update packets from neighboring super nodes, the information may be transmitted immediately within individual packets each corresponding to a received database update packet. However, this may increase packet rate, especially where the node is receiving database information from several other super nodes. Accordingly, the super nodes may transmit information accumulated from several received database update packets within a single cumulative packet for transmission to associated head nodes. Alternatively, each super node may include a timer that is initiated after adjustment of the interval between node status packet transmissions for head node clustering. The timer indicates expiration of predetermined time intervals, and may be set to any desired value. A super node floods a message in response to receiving new routing information within each periodic interval as indicated by the timer. The message includes the routing information received during that interval. This provides a super node an opportunity to aggregate data prior to transmission in order to reduce overhead traffic.

The present invention may achieve significant reductions in overhead traffic. By way of example only, the overhead traffic produced by conventional techniques and the present invention for a fully connected network (e.g., a network including nodes having direct communication with each other) is examined. Basically, two approaches may be utilized to flood database information. One approach is a conventional brute force or basic technique utilizing a flat or single level network architecture, while another approach includes the technique employed by the present invention described above. A comparison between the approaches may be performed based on the quantity of packets transmitted (e.g., excluding re-transmissions within the flat architecture and request messages within the present invention). The packet quantity for the present invention is measured from cluster head nodes. In other words, the second tier or cluster head nodes are considered as a flat architecture for the conventional approach, and as a hierarchical architecture for the present invention subsequent clustering and formation of the third tier. Unicast and broadcast transmission techniques are utilized for the comparison.

Basically, an exemplary network configuration includes 'N' second tier or cluster head nodes that are fully connected, where N is an integer generally greater than zero. Transmission from a single head node initiates a series of transmissions from other head nodes to flood a packet. In other words, a head node initially transmits a database update packet to N-1 destination head nodes, where each destination head node transmits the packet to the remaining N-2 destination head nodes. The total packet quantity, $B_{update}$, using the conventional approach may be expressed as follows:

$$D_1 = \{1, 2, 3\} \quad D_2 = \{1, 2, 3\} \quad D_3 = \{1, 2, 3, 4, 5, 8\}$$
$$D_4 = \{3, 4, 5, 8\} \quad D_5 = \{3, 4, 5, 8\} \quad D_6 = \{6, 7, 8\}$$
$$D_7 = \{6, 7, 8\} \quad D_8 = \{3, 4, 5, 6, 7, 8\}$$

The above expression provides a packet quantity for an update message received by any network node. With respect to a database refresh (e.g., each head node transmits information from its head link database to other head nodes), each head node basically transmits a packet in the manner of an update as described above. Thus, the total packet quantity, $B_{refresh}$, for a database refresh (e.g., $N \cdot B_{update}$) may be expressed as follows:

$$B_{refresh} = N(N-1)^2.$$

Referring to the present invention, upon completion of head node clustering, each head link database includes connectivity information pertaining to each network head node in response to the head nodes being fully connected. Thus, additional information is not required to be flooded, whereas flooding in a flat architecture is dependent upon the implementation and the above expression for $B_{update}$ provides the quantity of packets transmitted. The determination of the total packet quantity transmitted by the present invention is based on the conditions of a node receiving a database update packet from a source head node and subsequently flooding the received packet, while node status as a head node or super node remains constant. Accordingly, a present invention head node initially transmits an update packet to its corresponding super node. The super node subsequently transmits the packet to the remaining associated N-2 head nodes. Thus, the packet quantity for the present invention utilizing a unicast technique, $P_{update\ (unicast)}$, may be expressed as:

$$P_{update\ (unicast)} = 1 + (N-2) = N-1.$$

When the present invention employs a broadcast technique, a first packet is transmitted from a head node to a corresponding super node, while a second packet is subsequently broadcasted from the super node to the remaining super or head nodes. Thus, the packet quantity for the broadcast technique, $P_{update\ (broadcast)}$, is equal to two, and may be expressed as follows:

$$P_{update\ (broadcast)} = 2.$$

Figure 11:
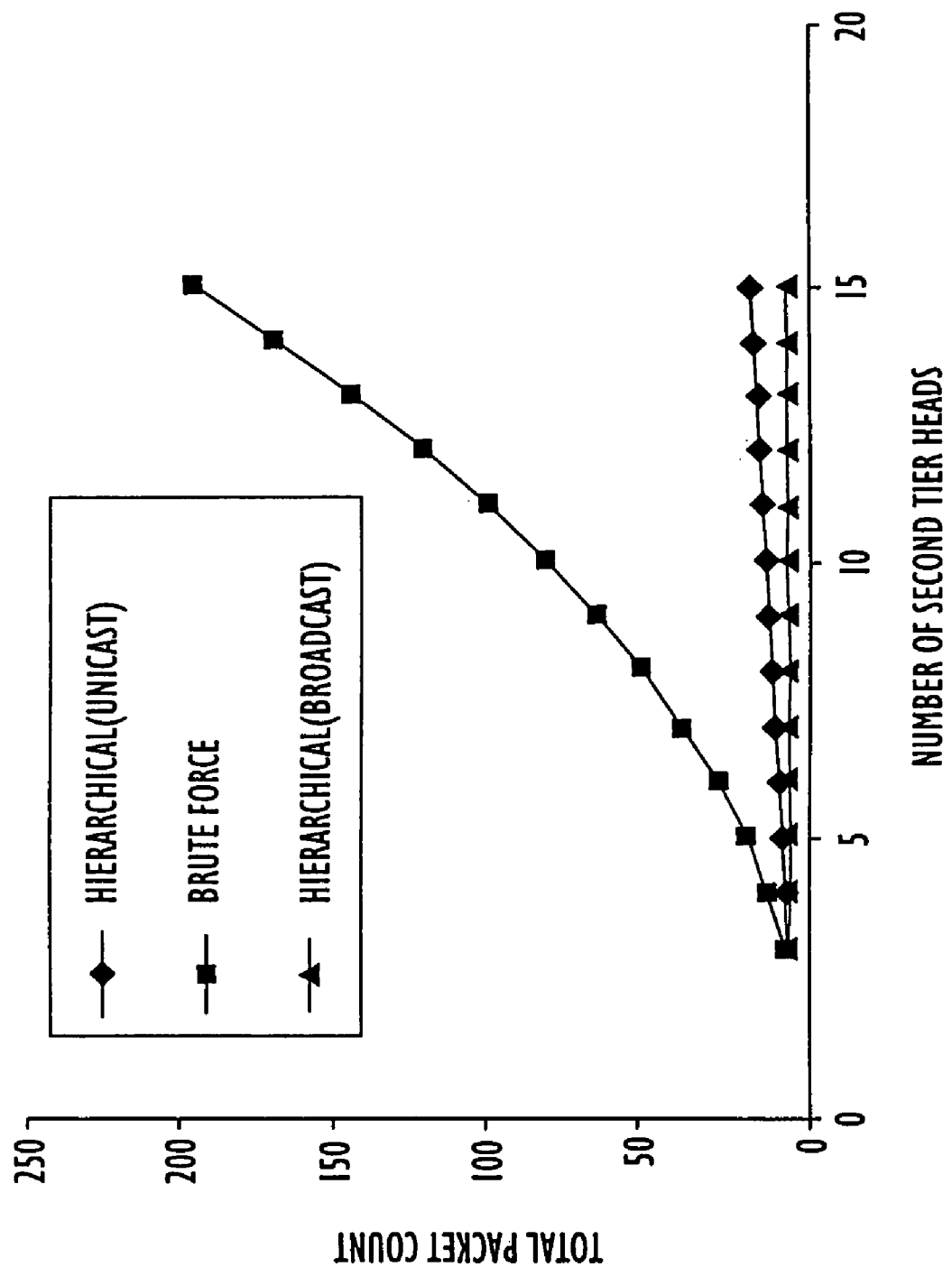
FIG. 11 is a graphical illustration of the relationship between the total quantity of overhead packets and the quantity of cluster head nodes for the present invention and conventional flooding techniques.

A graphical illustration of the relationship between the total packet quantity and quantity of head nodes for the conventional approach and the hierarchical approach of the present invention employing unicast and broadcast techniques is illustrated in FIG. 11. As shown in the figure, the present invention significantly reduces packet quantity relative to the conventional approach, especially as the quantity of network nodes increases. For example, when an exemplary network configuration includes ten head nodes, the corresponding packet quantity for the conventional approach is eighty-one, while the packet quantities for the present invention are nine for a three-tier architecture employing a unicast technique and two when employing the broadcast technique. Since clustering and routing are essential elements of self-organizing networks, such as those for ad hoc wireless communications, and since communication failure occurs in response to overhead consuming a significant portion of available bandwidth, the present invention reduces overhead traffic when flooding messages to thereby prevent communication failure and maintain a functioning network.

The present invention is not limited to the networks described herein, but may be applied to any static, mobile or wireless networks (e.g., commercial or military applications, ad hoc wireless network, etc.). Further, the present invention may be applied to any networks requiring self-organization (e.g., military applications), or those that dynamically determine potential routes for message transmission. Accordingly, the present invention has numerous commercial applications in various events (e.g., earthquake, fire, flood, rescue, criminal search, etc.) or within personal communication networks (e.g., within a campus). Moreover, the present invention may be applied in a cellular network, where a base station fails and a multi-hop wireless network is utilized to transmit data.

It will be appreciated that the embodiments described above and illustrated in the drawings represent only a few of the many ways of implementing a method and apparatus for communication network cluster formation and transmission of node link status messages with reduced protocol overhead traffic.

The communication networks employing the present invention nodes may include any quantity of those nodes or tiers. The present invention network nodes may be arranged to form any plural tier network configuration and may transmit information throughout that network configuration in the manner described above to reduce protocol overhead traffic. The network nodes may be arranged in any fashion into any quantity of clusters, cells or tiers each having any quantity of member nodes, head nodes and/or super nodes. The backbone network may include any quantity of head nodes, while communications within a cluster and between neighboring cluster head and/or super nodes may utilize the same or different transmission frequencies. The network may include any quantity of nodes, head nodes and super nodes, where each node may have any quantity of neighboring nodes. The head and super nodes may respectively have any quantity of associated member and head nodes. The variables used herein (e.g., N, P, Q, L, W, Y, Z, etc.) merely describe network and data configurations, and do not limit the present invention to any particular configuration. The variables may be any type of number (e.g., integer, real, etc.) having any desired value. The neighbor sets may include any information to identify neighboring nodes arranged in any fashion.

The formation of cells and designation of head and super nodes may be predetermined or accomplished dynamically via the technique described above. The nodes may communicate via any suitable communications medium (e.g., wired or wireless communication devices, etc.). The present invention node may include any quantity of conventional or other transmitters, where each transmitter may transmit signals at any suitable frequency and in any suitable energy form (e.g., radio signals, microwave, optical signals, etc.), and any quantity of conventional or other receivers, where each receiver may receive signals at any suitable frequency and in any suitable energy form (e.g., radio signals, microwave, optical signals, etc.). Alternatively, the present invention node may include any quantity of combined transmitting/receiving devices. The node identifier may include any quantity of any types of alphanumeric or other characters or symbols which provide the identification of a node within a sequence. The sequence may be conventional and known (e.g., numeric order, alphabetical order, etc.), or may be predetermined (e.g., created or constructed) and provided to the nodes.

The processor of the present invention node may be implemented by any conventional or other microprocessor, controller or circuitry to perform the functions described herein, while any quantity of processors or processing devices or circuitry may be employed within the present invention node where the processor functions may be distributed in any fashion among any quantity of modules, processors or other processing devices or circuits. The software for the processor of the present invention node may be implemented in any suitable computer language, and could be developed by one of ordinary skill in the computer and/or programming arts based on the functional description contained herein and the flow charts illustrated in the drawings. Further, any references herein of software performing various functions generally refer to processors performing those functions under software control. The software and/or algorithms described above and illustrated in the flow charts may be modified in any manner that accomplishes the functions described herein. The present invention node may alternatively include any components arranged in any fashion to facilitate distribution of packets within the network in the manner described above.

The database update, node status and other packets or messages (e.g., acknowledgment, point-to-point message, broadcast message, etc.) may be of any size, may have any format, may contain any desired information and may be transmitted via any suitable transmission technique (e.g., unicast, broadcast, etc.). The node status packets may be transmitted at any suitable transmission rate or have any desired interval between transmissions. The initial interval between node status packet transmissions may be set to any desired value. This interval may be adjusted in response to any suitable conditions (e.g., neighbor quantity, expiration of timers, etc.). The interval adjustment offset may be set to any desired value or function to achieve transmission times producing an acceptable quantity of collisions for network operation. The offset may be distributed among nodes in any desired fashion via any suitable function (e.g., a uniform distribution function, etc.). The timers (e.g., periodic interval timer for accumulating information prior to transmission, etc.) may be implemented by any conventional or other timing mechanisms (e.g., processor clock, external hardware, software, etc.) and may be set to any desired intervals (e.g., fractions of seconds, seconds, minutes, hours, days, etc.) for their respective functions. Similarly, the counter (e.g., for node status packet transmissions, etc.) may be implemented by any conventional or other counting mechanisms (e.g., external hardware, software, etc.).

Cluster formation to determine head and member status may be initiated in response to any suitable conditions (e.g., transmission intervals, expiration of timers, etc.), while the threshold of node status packet transmissions may be set to any desired value. The head and super nodes may be identified in any manner that determines network nodes which are required to facilitate communications within the network (e.g., based on neighbor sets, shortest path techniques, node transmission ranges, etc.). The master node may be selected in any fashion and may subsequently determine head nodes via any conventional or other techniques. The head and super nodes may transmit any information in any manner (e.g., within any packets, etc.) to inform neighboring nodes of the head or super node designations. Similarly, the master node may transmit any information in any manner to inform nodes of their head node status. A member or head node having plural head or super nodes may select a corresponding head or super node based on any desired criteria (e.g., strongest signal, connectivity, etc.).

The various messages may include any identifier to identify the type of message or packet. The node status and database update packets may be transmitted at any desired intervals and/or in response to any desired events or conditions. The flooding may utilize any unicast, broadcast or other transmission techniques either individually or in any combination, while any types of messages or other information (e.g., ROSPF information, database synchronization, routing control information, etc.) may be flooded in the manner described above. The packets transmitted in the flooding process may include any quantity of accumulated information (e.g., information received from any quantity of packets received by a node). Further, the flooded packets may include information received during particular time intervals, where the time interval and associated timer may be set to any desired values.

The communication network may employ any suitable intranet and/or internetworking communications protocols to facilitate reception, processing and transference of messages or packets within or external of the network. The present invention may be utilized within any intranet, internetworking or other protocol to transmit or flood messages within the network in accordance with that protocol. The node databases (e.g., routing, head link, etc.) may be implemented by any conventional database or other storage structure (e.g., processor memory, external memory, file, data structure (e.g., array, queue, stack, etc.), etc.) and may have any desired storage capacity to contain any desired information. The head link or other databases may be examined in any manner and utilize any conventional or other techniques to determine information missing from those databases.

It is to be understood that the present invention is not limited to the applications or networks described herein, but may be utilized for various communication applications or networks, especially those employing link-state based routing protocols. Further, the present invention may be applied to any applications requiring flooding of routing or any other information.

From the foregoing description it will be appreciated that the invention makes available a novel method and apparatus for communication network cluster formation and transmission of node link status messages with reduced protocol overhead traffic wherein network nodes crucial for relaying network traffic are designated as head nodes to form a hierarchical network configuration, while this technique is further applied to those designated head nodes to form a multiple tier architecture for flooding information with reduced overhead traffic.

Having described preferred embodiments of a new and improved method and apparatus for communication network cluster formation and transmission of node link status messages with reduced protocol overhead traffic, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. In a communications network including a plurality of communication units, wherein at least one of those units is designated as a member unit for transmitting and receiving messages and at least one of those units is designated as a routing unit for routing said messages from said member units, a communication unit to transmit and receive messages within said network comprising:
 a transmitter to transmit an outgoing message to each neighboring unit of said communication unit;
 a receiver to receive an incoming message from said each neighboring unit;
 a storage unit to store network connectivity information relating to said communication unit and corresponding neighboring units; and
 a processor to control said transmission and reception of said outgoing and incoming messages, wherein said processor includes:
  a configuration module to designate a status of said communication unit as one of said routing unit and said member unit to configure said communications network, wherein said configuration module includes:
   a neighbor module to examine said network connectivity information and identify neighboring units of said communication unit that are isolated from communications with remaining neighboring units of said communication unit:
   a designation module to designate said communication unit as said routing unit in response to determining that said communication unit communicates with at least one neighboring unit that is isolated from communications with remaining neighboring units of said communication unit, wherein said communication unit designation as said routing unit is fixed for routing subsequent network messages; and
  a monitor module to re-evaluate said communication unit designation in response to connectivity changes in said network.

2. The unit of claim 1 wherein said transmitter transmits said outgoing message in the form of radio signals.

3. The unit of claim 1 wherein said receiver receives said incoming message in the form of radio signals.

4. The unit of claim 1 wherein said processor further includes:
 a status transmission module to facilitate transmission of a unit status message at a periodic time interval, wherein said unit status message includes unit connectivity information relating to network connectivity of said communication unit; and
 a status reception module to facilitate reception of said unit status message from said each neighboring unit and to update said connectivity information within said storage unit in accordance with unit connectivity information contained within each received unit status message.

5. The unit of claim 4 wherein said processor further includes:
 an interval module to adjust said periodic time interval in response to detecting modifications in network connectivity indicated by said updated connectivity information within said storage unit.

6. The unit of claim 5 wherein said interval module further includes:
 an interval adjustment module to increase said periodic time interval in response to determining that a quantity of neighboring units of said communication unit is equal to said neighboring unit quantity of an immediately preceding periodic time interval.

7. The unit of claim 4 wherein said configuration module further includes:
 a transmission interval module to maintain a count of unit status message transmissions by said communications unit and to determine when a predetermined quantity of said unit status messages has been transmitted;
 an evaluation module to determine the presence of modifications to said connectivity information within said storage unit during said unit status message transmissions; and
 a unit status module to determine said status of said communication unit as said routing unit in response to an absence of modifications to said connectivity information as determined by said evaluation module.

8. The unit of claim 7 wherein said unit status module further includes:
 a routing status module to designate said communication unit as said routing unit in response to determining that said communication unit communicates with at least one neighboring unit that is isolated from communications with remaining neighboring units of said communication unit;
 a master status module to designate said communication unit as a master unit in response to determining that said communication unit and each neighboring unit are in communication with the same units and said communication unit is associated with an identifier superior to identifiers of said neighboring units; and
 a member status module to designate said communication unit as a member unit of a corresponding routing unit in response to said master status module determining that said communication unit and each neighboring unit are in communication with at least one different unit and said routing status module determining that said communication unit fails to qualify as said routing unit.

9. The unit of claim 8 wherein said master status module further includes:
a routing unit selection module to determine said status of said neighboring units as said routing and member units in response to said communication unit being designated as said master unit; and
a status transmission module to facilitate transmission of status information to neighboring designated routing units to inform those units of their designation as routing units by said communication unit serving as said master unit.

10. The unit of claim 1 wherein said configuration module further includes:
a link storage unit to store connectivity information relating to routing units; and
a routing unit configuration module to examine said network connectivity information within said link storage unit in response to said communication unit being designated as said routing unit and to designate said communication unit as a transmission routing unit in response to determining that said communication unit communicates with at least one neighboring routing unit that is isolated from communications with remaining neighboring routing units of said communication unit.

11. The unit of claim 10 wherein said transmission routing unit transmits update messages including network connectivity information, and said routing unit configuration module further includes:
a message forwarding module to receive an update message from a neighboring transmission routing unit in response to said communication unit being designated as said transmission routing unit and to transmit said received message to neighboring routing units to facilitate synchronization of said link storage unit of each said routing unit.

12. The unit of claim 11 wherein said routing unit configuration module further includes:
an update module to receive an update message from a neighboring transmission routing unit in response to said communication unit being designated as said routing unit and to update said link storage unit with said connectivity information contained within said received update message;
a data integrity module to examine said network connectivity information within said link storage unit and determine information missing from said link storage unit in response to said update by said update module; and
a request module to request said neighboring transmission routing unit to transmit said missing information in response to said data integrity module determining that information is missing from said link storage unit.

13. The unit of claim 12 wherein said routing unit configuration module further includes:
a request processing module to receive said request from a neighboring routing unit in response to said communication unit being designated as a transmission routing unit and to process said received request to transmit information identified in said request to that neighboring routing unit.

14. The unit of claim 11 wherein said message forwarding module further includes:
a data accumulation module to accumulate information received within plural update messages and to transmit said accumulated information in the form of a single transmission to neighboring routing units to facilitate synchronization of said link storage unit of said each routing unit.

15. The unit of claim 11 wherein said message forwarding module further includes:
a timer to indicate expiration of periodic reception intervals; and
a data accumulation module to accumulate information received within each of said periodic reception intervals and to transmit said accumulated information of each periodic reception interval in the form of a single transmission to neighboring routing units at expiration of that periodic reception interval to facilitate synchronization of said link storage unit of said each routing unit.

16. In a communications network including a plurality of communication units, wherein at least one of those units is designated as a member unit for transmitting and receiving messages and at least one of those units is designated as a routing unit for routing said messages from said member units, a method of configuring a network communication unit to transmit and receive messages within said network comprising the steps of:
(a) examining network connectivity information relating to said communication unit and corresponding neighboring units stored in a storage unit of said communication unit and identifying neighboring units that are isolated from communications with remaining neighboring units of said communication unit;
(b) designating said communication unit as said routing unit in response to determining that said communication unit communicates with at least one neighboring unit that is isolated from communications with remaining neighboring units of said communication unit, wherein said communication unit designation as said routing unit is fixed for routing subsequent network messages; and
(c) re-evaluating said communication unit designation in response to connectivity changes in said network.

17. The method of claim 16 wherein said messages are transmitted in the form of radio signals.

18. The method of claim 16 wherein step (a) further includes:
(a.1) transmitting a unit status message at a periodic time interval, wherein said unit status message includes unit connectivity information relating to network connectivity of said communication unit; and
(a.2) receiving said unit status message from said each neighboring unit and updating said connectivity information within said storage unit in accordance with unit connectivity information contained within each received unit status message.

19. The method of claim 18 wherein step (a) further includes:
(a.3) adjusting said periodic time interval in response to detecting modifications in network connectivity indicated by said updated connectivity information within said storage unit.

20. The method of claim 19 wherein step (a.3) includes:
(a.3.1) increasing said periodic time interval in response to determining that a quantity of neighboring units of said communication unit is equal to said neighboring unit quantity of an immediately preceding periodic time interval.

21. The method of claim 18 wherein step (b) further includes:
(b.1) maintaining a count of unit status message transmissions by said communications unit and determining when a predetermined quantity of said unit status messages has been transmitted;

(b.2) determining the presence of modifications to said connectivity information within said storage unit during said unit status message transmissions; and (b.3) determining said status of said communication unit as said routing unit in response to an absence of modifications to said connectivity information as determined in step (b.2).

22. The method of claim 21 wherein step (b.3) further includes:

(b.3.1) designating said communication unit as said routing unit in response to determining that said communication unit communicates with at least one neighboring unit that is isolated from communications with remaining neighboring units of said communication unit;

(b.3.2) designating said communication unit as a master unit in response to determining that said communication unit and each neighboring unit are in communication with the same units and said communication unit is associated with an identifier superior to identifiers of said neighboring units; and (b.3.3) designating said communication unit as a member unit of a corresponding routing unit in response to step (b.3.2) determining that said communication unit and each neighboring unit are in communication with at least one different unit and step (b.3.1) determining that said communication unit fails to qualify as said routing unit.

23. The method of claim 22 wherein step (b.3.2) further includes:

(b.3.2.1) determining said status of said neighboring units as said routing and member units in response to said communication unit being designated as said master unit; and (b.3.2.2) transmitting status information to neighboring designated routing units to inform those units of their designation as routing units by said communication unit serving as said master unit.

24. The method of claim 16 further including:

(d) examining network connectivity information relating to routing units stored within a link storage unit of said communication unit in response to said communication unit being designated as said routing unit; and (e) designating said communication unit as a transmission routing unit in response to determining that said communication unit communicates with at least one neighboring routing unit that is isolated from communications with remaining neighboring routing units of said communication unit.

25. The method of claim 24 wherein said transmission routing unit transmits update messages including network connectivity information, and step (e) further includes:

(e.1) receiving an update message from a neighboring transmission routing unit in response to said communication unit being designated as said transmission routing unit and transmitting said received message to neighboring routing units to facilitate synchronization of said link storage unit of each said routing unit.

26. The method of claim 25 wherein step (e) further includes:

(e.2) receiving an update message from a neighboring transmission routing unit in response to said communication unit being designated as said routing unit and updating said link storage unit with said connectivity information contained within said received update message;

(e.3) examining said network connectivity information within said link storage unit and determining information missing from said link storage unit in response to said update by step (e.2); and (e.4) requesting said neighboring transmission routing unit to transmit said missing information in response to step (e.3) determining that information is missing from said link storage unit.

27. The method of claim 26 wherein step (e) further includes:

(e.5) receiving said request from a neighboring routing unit in response to said communication unit being designated as a transmission routing unit and processing said received request to transmit information identified in said request to that neighboring routing unit.

28. The method of claim 25 wherein step (e.1) further includes:

(e.1.1) accumulating information received within plural update messages and transmitting said accumulated information in the form of a single transmission to neighboring routing units to facilitate synchronization of said link storage unit of said each routing unit.

29. The method of claim 25 wherein step (e.1) further includes:

(e.1.1) indicating expiration of periodic reception intervals; and (e.1.2) accumulating information received within each of said periodic reception intervals and transmitting said accumulated information of each periodic reception interval in the form of a single transmission to neighboring routing units at expiration of that periodic reception interval to facilitate synchronization of said link storage unit of said each routing unit.

30. A communications network comprising:

a plurality of communication units to transmit and receive messages within said network, wherein each said communication unit includes:

a status transmission module to facilitate periodic transmission of a unit status message;

an interval module to adjust the time between each said periodic transmission in response to detecting modifications in connectivity with neighboring units; and a configuration module to determine a status of that communication unit as a routing unit for routing network traffic or as a member unit of a corresponding routing unit in accordance with information contained within received unit status messages, wherein said communication unit status as said routing unit is fixed for routing subsequent network messages and re-evaluated in response to changes in network connectivity.

31. The network of claim 30 wherein said each communication unit transmits messages in the form of radio signals.

32. The network of claim 30 wherein said interval module further includes:

an interval adjustment module to increase said time between each said periodic transmission in response to determining that a quantity of neighboring units of that communication unit is equal to said neighboring unit quantity associated with an immediately preceding periodic transmission.

33. In a communications network including a plurality of communication units to transmit and receive messages within said network, a method of transmitting and receiving messages comprising the steps of:

(a) periodically transmitting a unit status message from each communication unit;

(b) adjusting the time between each periodic transmission of a communication unit in response to that communication unit detecting modifications in connectivity with neighboring units; and (c) determining a status of said each communication unit as a routing unit for routing network traffic or as a member unit of a corresponding routing unit in accordance with information contained within received unit status messages, wherein said communication unit status as said routing unit is fixed for routing subsequent network messages and re-evaluated in response to changes in network connectivity.

34. The method of claim 33 wherein said each communication unit transmits messages in the form of radio signals.

35. The method of claim 33 wherein step (b) further includes:
(b.1) increasing said time between each said periodic transmission in response to determining that a quantity of neighboring units of that communication unit is equal to said neighboring unit quantity associated with an immediately preceding periodic transmission.

36. A communications network comprising:
a plurality of communication units forming a first network tier to transmit and receive messages within said network, wherein at least one of said communication units is designated as a routing unit to form a second network tier to route network traffic and at least one of said designated routing units is designated as a transmission routing unit to form a third network tier to transmit network information throughout said second and third network tiers, and wherein each said communication unit includes:
   a configuration module to determine a status of that communication unit as said routing unit of said second network tier for routing network traffic or as a member unit of said first network tier and associated with a routing unit, wherein said communication unit status as a routing unit is fixed for routing subsequent network messages;
   a routing unit configuration module to determine a status of that communication unit as a transmission routing unit in response to that communication unit being designated as said routing unit, wherein said communication unit status as a transmission routing unit is fixed for flooding subsequent network connectivity messages; and
   an evaluation module to re-evaluate said communication unit status in response to connectivity changes in said network.

37. The network of claim 36 wherein said each communication unit transmits messages in the form of radio signals.

38. The network of claim 36 wherein said configuration module further includes a unit designation module to examine network connectivity information relating to that communication unit and to designate that communication unit as said routing unit in response to that communication unit communicating with at least one neighboring unit that is isolated from communications with remaining neighboring units of that communication unit.

39. The network of claim 36 wherein said routing unit configuration module further includes a routing unit designation module to examine network connectivity information relating to designated routing units stored within a link storage unit of that communication unit and to designate that communication unit as a transmission routing unit in response to that communication unit communicating with at least one neighboring routing unit that is isolated from communications with remaining neighboring routing units of that communication unit.

40. The network of claim 39 wherein said transmission routing unit transmits update messages including network connectivity information, and said routing unit configuration module further includes:
   a message forwarding module to receive an update message from a neighboring transmission routing unit in response to that communication unit being designated as said transmission routing unit and to transmit said received message to neighboring routing units of that communication unit to facilitate synchronization of said link storage unit of each said routing unit.

41. The network of claim 40 wherein said routing unit configuration module further includes:
   an update module to receive an update message from a neighboring transmission routing unit in response to that communication unit being designated as said routing unit and to update said link storage unit of that communication unit with said connectivity information contained within said received update message;
   a data integrity module to examine said network connectivity information within a link storage unit of that communication unit and determine information missing from that link storage unit in response to said update by said update module; and
   a request module to request said neighboring transmission routing unit to transmit said missing information in response to said data integrity module determining that information is missing from said link storage unit of that communication unit.

42. The unit of claim 41 wherein said routing unit configuration module further includes:
   a request processing module to receive said request from a neighboring routing unit in response to that communication unit being designated as a transmission routing unit and to process said received request to transmit information identified in said request to that neighboring routing unit.

43. The network of claim 40 wherein said message forwarding module further includes:
   a data accumulation module to accumulate information received within plural update messages and to transmit said accumulated information in the form of a single transmission to neighboring routing units of that communication unit to facilitate synchronization of said link storage unit of said each routing unit.

44. The network of claim 40 wherein said message forwarding module further includes:
   a timer to indicate expiration of periodic reception intervals; and
   a data accumulation module to accumulate information received within each of said periodic reception intervals and to transmit said accumulated information of each periodic reception interval in the form of a single transmission to neighboring routing units of that communication unit at expiration of that periodic reception interval to facilitate synchronization of said link storage unit of said each routing unit.

45. In a communications network including a plurality of communication units forming a first network tier to transmit and receive messages within said network, wherein at least one of said communication units is designated as a routing unit to form a second network tier to route network traffic and at least one of said designated routing units is designated as a transmission routing unit to form a third network tier to transmit network information throughout said second and third network tiers, a method of configuring said network including the steps of:
   (a) determining a status of each communication unit as said routing unit of said second network tier for routing network traffic or as a member unit of said first network tier and associated with a routing unit, wherein said communication unit status as a routing unit is fixed for routing subsequent network messages;
   (b) determining a status of each communication unit as said transmission routing unit to transmit said network information throughout said second and third network tiers in response to that communication unit being designated as said routing unit, wherein said communication unit status as a transmission routing unit is fixed for flooding subsequent network connectivity messages; and (c) re-evaluating said communication unit status in response to connectivity changes in said network.

46. The method of claim 45 wherein said each communication unit transmits messages in the form of radio signals.

47. The method of claim 45 wherein step (a) further includes:

(a.1) examining network connectivity information relating to each communication unit and designating as said routing unit each communication unit communicating with at least one neighboring unit isolated from communications with remaining neighboring units of that communication unit.

48. The method of claim 45 wherein step (b) further includes:

(b.1) examining network connectivity information relating to designated routing units and stored within a link storage unit of said each communication unit and designating as said transmission routing unit each communication unit that communicates with at least one neighboring routing unit isolated from communications with remaining neighboring routing units of that communication unit.

49. The method of claim 48 wherein said transmission routing unit transmits update messages including network connectivity information, and step (b) further includes:

(b.2) receiving an update message from a corresponding neighboring transmission routing unit at each communication unit designated as said transmission routing unit and transmitting said received message to neighboring routing units of that communication unit to facilitate synchronization of said link storage unit of each said routing unit.

50. The method of claim 49 wherein step (b) further includes:

(b.3) receiving an update message from a corresponding neighboring transmission routing unit at each communication unit designated as said routing unit and updating said link storage unit of that communication unit with said connectivity information contained within said received update message;

(b.4) examining said network connectivity information within said link storage unit of each communication unit and determining information missing from that link storage unit in response to said update; and (b.5) requesting said corresponding neighboring transmission routing unit of each communication unit designated as said routing unit to transmit said missing information in response to said data integrity module determining that information is missing from a link storage unit of that communication unit.

51. The method of claim 50 wherein step (b) further includes:

(b.6) receiving at each communication unit designated as said transmission routing unit said request from a corresponding neighboring routing unit and processing said received request to transmit information identified in said request to that neighboring routing unit.

52. The method of claim 49 wherein step (b.2) further includes:

(b.2.1) accumulating information received within plural update messages at each communication unit designated as said transmission routing unit and transmitting said accumulated information in the form of a single transmission to corresponding neighboring routing units of that communication unit to facilitate synchronization of said link storage unit of said each routing unit.

53. The method of claim 49 wherein step (b.2) further includes:

(b.2.1) indicating expiration of periodic reception intervals; and (b.2.2) accumulating information received within each of said periodic reception intervals at each communication unit designated as said transmission routing unit and transmitting said accumulated information of each periodic reception interval in the form of a single transmission to corresponding neighboring routing units of that communication unit at expiration of that periodic reception interval to facilitate synchronization of said link storage unit of said each routing unit.

54. In a wireless communications network including a plurality of communication units, wherein at least one of those units is designated as a member unit for transmitting and receiving messages and at least one of those units is designated as a relay unit for transferring messages from said member units, a communication unit to transmit and receive messages within said network comprising:

a transmitter to transmit an outgoing message in the form of radio signals to each neighboring unit of said communication unit;

a receiver to receive an incoming message in the form of radio signals from said each neighboring unit;

a storage unit to store network information relating to said communication unit and corresponding neighboring units; and a processor to control said transmission and reception of said outgoing and incoming messages, wherein said processor includes:

a configuration module to designate a status of said communication unit as one of said relay unit and said member unit to configure said communications network, wherein said configuration module includes:

a neighbor module to examine network connectivity information and identify at least one neighboring unit of said communication unit that is required to utilize said communication unit to communicate with network communication units that are outside the range of and greater than one hop away from that neighboring unit;

a designation module to designate said communication unit as said relay unit based on said examination and in response to determining that at least one neighboring communication unit is required to utilize said communication unit to communicate with network communication units that are outside the range of and greater than one hop away from said neighboring communication unit, wherein said communication unit designation as said relay unit is fixed for transferring subsequent network messages; and an evaluation module to re-evaluate said communication unit designation in response to connectivity changes in said network.

55. The unit of claim 54, wherein said network is an ad-hoc wireless communications network.

56. The unit of claim 54, wherein said processor further includes:

a status transmission module to facilitate transmission of a unit status message at a periodic time interval, wherein said unit status message includes network connectivity information.

57. The unit of claim 56, wherein said processor further includes:
   an interval module to adjust said periodic time interval to accommodate network conditions.

58. The unit of claim 54, wherein said plurality of communication units include said member units and said designated relay units, and wherein said relay units generate and forward network connectivity information through said network.

59. In a wireless communications network including a plurality of communication units, wherein at least one of those units is designated as a member unit for transmitting and receiving messages and at least one of those units is designated as a relay unit for transferring messages from said member units, a method of configuring a network communication unit to transmit and receive messages within said network comprising the steps of:
   (a) examining network connectivity information relating to said communication unit and corresponding neighboring units stored in a storage unit of said communication unit and identifying at least one neighboring unit of said communication unit that is required to utilize said communication unit to communicate with network communication units that are outside the range of and greater than one hop away from that neighboring unit;
   (b) designating said communication unit as said relay unit based on said examination and in response to determining that at least one neighboring communication unit is required to utilize said communication unit to communicate with network communication units that are outside the range of and greater than one hop away from said neighboring communication unit, wherein said communication unit designation as said relay unit is fixed for transferring subsequent network messages; and
   (c) re-evaluating said communication unit designation in response to connectivity changes in said network.

60. The method of claim 59, wherein said network is an ad-hoc wireless communications network.

61. The method of claim 59, wherein step (a) further includes:
   (a.1) transmitting a unit status message at a periodic time interval, wherein said unit status message includes network connectivity information.

62. The method of claim 61, wherein step (a) further includes:
   (a.2) adjusting said periodic time interval to accommodate network conditions.

63. The method of claim 59, wherein said plurality of communication units include said member units and said designated relay units, and said method further includes:
   (d) generating and forwarding network connectivity information through said network via said designated relay units.

64. A wireless communications network comprising:
   a plurality of communication units to transmit and receive messages in the form of radio signals within said network, wherein said communication units: examine network connectivity information; identify communication units that are required to be utilized by associated neighboring units to communicate with network communication units that are outside the range of and greater than one hop away from those neighboring units; designate at least one communication unit as a relay unit to transfer network information based on said examination and in response to determining that said at least one communication unit is required to be utilized by at least one neighboring unit to communicate with communication units that are outside the range of and greater than one hop away from said neighboring units, wherein said communication unit designation as said relay unit is fixed for transferring subsequent network messages; and re-evaluate said communication unit designation in response to connectivity changes in said network.

65. The network of claim 64, wherein said network is an ad-hoc wireless communications network.

66. The network of claim 64, wherein said communication units each include:
   a status transmission module to facilitate transmission of a unit status message at a periodic time interval, wherein said unit status message includes network connectivity information.

67. The network of claim 66, wherein said communication units each further include:
   an interval module to adjust said periodic time interval to accommodate network conditions.

68. The network of claim 64, wherein said designated relay units generate and forward network connectivity information through said network.

* * * * *